United States Patent
Yamagata et al.

(10) Patent No.: US 6,714,676 B2
(45) Date of Patent: *Mar. 30, 2004

(54) IMAGE PROCESSING APPARATUS AND IMAGE PROCESSING METHOD

(75) Inventors: Shigeo Yamagata, Yokohama (JP); Takeshi Aoyagi, Tokyo (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,351

(22) Filed: Aug. 27, 1998

(65) Prior Publication Data

US 2002/0039444 A1 Apr. 4, 2002

(30) Foreign Application Priority Data

Sep. 4, 1997 (JP) .............................................. 9-239589

(51) Int. Cl.$^7$ .............................. G06K 9/34; G06K 9/68
(52) U.S. Cl. ....................... 382/175; 382/218; 382/180; 382/190
(58) Field of Search ................................. 382/173, 174, 382/175, 176, 177, 178, 179, 180, 190, 199, 195, 203, 218, 219, 254, 226, 272

(56) References Cited

U.S. PATENT DOCUMENTS

| | | | | |
|---|---|---|---|---|
| 4,700,399 A | * | 10/1987 | Yoshida | 382/17 |
| 5,031,034 A | | 7/1991 | Shimizu et al. | 358/79 |
| 5,093,869 A | * | 3/1992 | Alves et al. | 382/22 |
| 5,126,838 A | * | 6/1992 | Ohsawa et al. | 358/75 |
| 5,235,383 A | | 8/1993 | Tada et al. | 399/112 |
| 5,239,383 A | | 8/1993 | Ikeda et al. | 358/300 |
| 5,251,023 A | | 10/1993 | Arimoto et al. | 358/529 |
| 5,754,707 A | * | 5/1998 | Knowlton | 382/254 |

\* cited by examiner

Primary Examiner—Andrew W. Johns
Assistant Examiner—Amir Alavi
(74) Attorney, Agent, or Firm—Fitzpatrick, Cella, Harper & Scinto

(57) ABSTRACT

An object of the invention is to effectively and accurately detect a characteristic of an image. In order to achieve the object, the invention comprises a calculating means for calculating an isolated amount of a pixel value in each of plural areas respectively having different sizes, an integrating means for integrating the calculated isolated amount in a predetermined area, and an extracting means for extracting the image portion having the predetermined attribute, according to the integrated isolated amount.

8 Claims, 30 Drawing Sheets

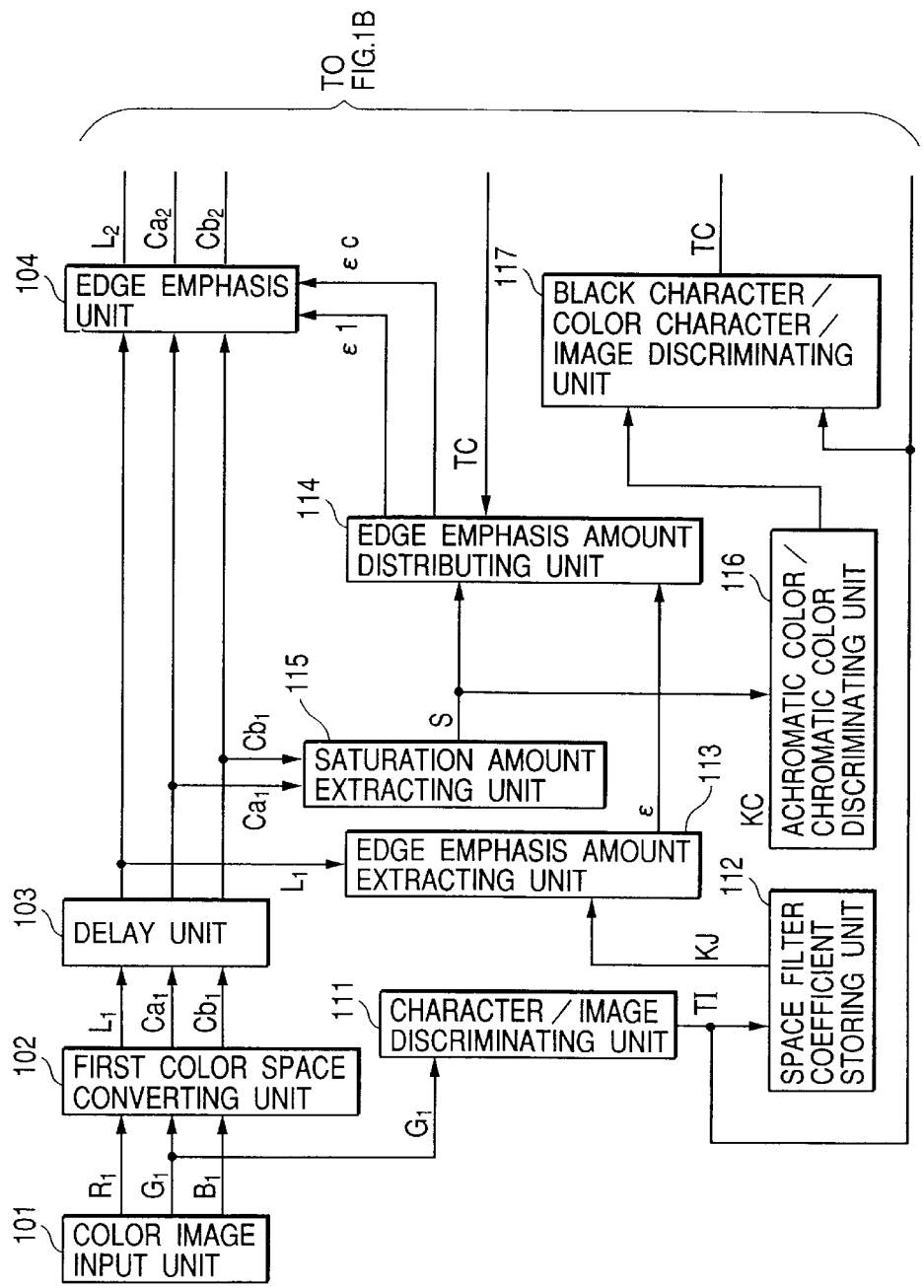

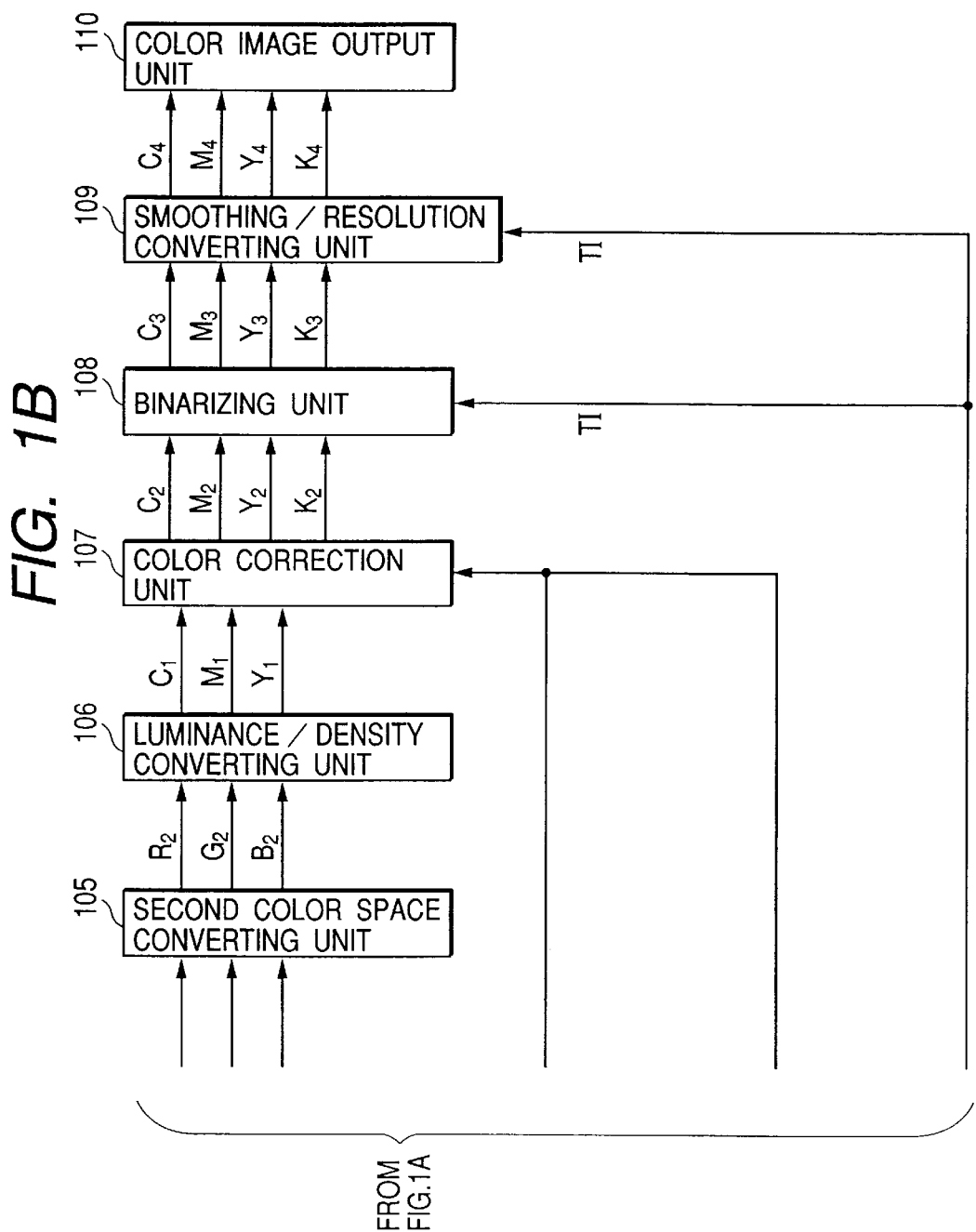

| -10 | -23 | -22 | -23 | -10 |
|---|---|---|---|---|
| -23 | 10 | 54 | 10 | -23 |
| -22 | 54 | 56 | 54 | -22 |
| -23 | 10 | 54 | 10 | -23 |
| -10 | -23 | -22 | -23 | -10 |

| -4 | -10 | -9 | -10 | -4 |
|---|---|---|---|---|
| -10 | 8 | 34 | 8 | -10 |
| -9 | 34 | -36 | 34 | -9 |
| -10 | 8 | 34 | 8 | -10 |
| -4 | -10 | -9 | -10 | -4 |

\* 1/128

DIAGONAL EDGE COMPONENT
DETECTION AREA

HORIZONTAL / VERTICAL
EDGE DETECTION AREA

FIG. 7A

5×5 FILTER COEFFICIENT

KM0 [X] [Y]

| -1 | 0 | -1 | 0 | -1 |
|---|---|---|---|---|
| 0 | 0 | 0 | 0 | 0 |
| -1 | 0 | 8 | 0 | -1 |
| 0 | 0 | 0 | 0 | 0 |
| -1 | 0 | -1 | 0 | -1 |

FIG. 7B

3×3 FILTER COEFFICIENT

KM1 [X] [Y]

| 0 | 0 | 0 | 0 | 0 |
|---|---|---|---|---|
| 0 | 0 | -1 | 0 | 0 |
| 0 | 0 | 2 | 0 | 0 |
| 0 | 0 | -1 | 0 | 0 |
| 0 | 0 | 0 | 0 | 0 |

KM2 [X] [Y]

| 0 | 0 | 0 | 0 | 0 |
|---|---|---|---|---|
| 0 | 0 | 0 | 0 | 0 |
| 0 | -1 | 2 | -1 | 0 |
| 0 | 0 | 0 | 0 | 0 |
| 0 | 0 | 0 | 0 | 0 |

FIG. 7C

7×7 FILTER COEFFICIENT

KM3 [X] [Y]

| -1 | 0 | 0 | -1 | 0 | 0 | -1 |
|---|---|---|---|---|---|---|
| 0 | 0 | 0 | 0 | 0 | 0 | 0 |
| 0 | 0 | 0 | 0 | 0 | 0 | 0 |
| -1 | 0 | 0 | 8 | 0 | 0 | -1 |
| 0 | 0 | 0 | 0 | 0 | 0 | 0 |
| 0 | 0 | 0 | 0 | 0 | 0 | 0 |
| -1 | 0 | 0 | -1 | 0 | 0 | -1 |

DETECT EDGE COMPONENT OF BOTH
VERTICAL AND DIAGONAL DIRECTION

DETECT EDGE COMPONENT OF ONLY
DIAGONAL DIRECTION

FIG. 9A
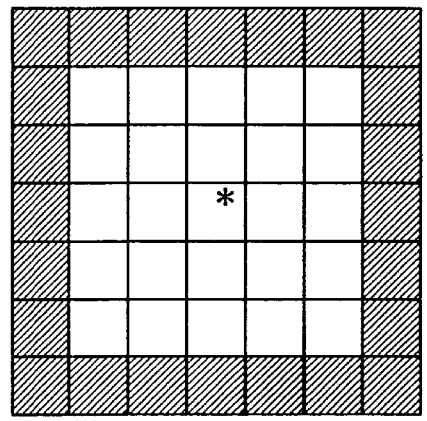
* : REMARKABLE PIXEL POSITION
( DL0 [V] [H] )
FIG. 9B
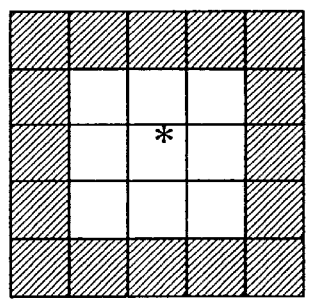
* : REMARKABLE PIXEL POSITION
( DL0 [V] [H] )
FIG. 10
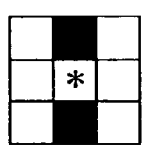 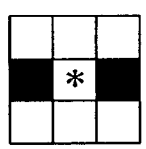 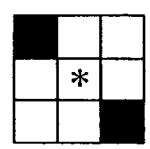 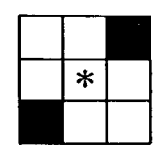
■ : DL1 = 1   □ : DONT CARE
* : REMARKABLE PIXEL POSITION
( DL1 [V] [H] )

FIG. 11A

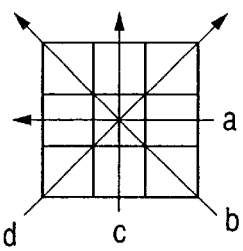

BDT IS REFERRED IN EACH OF a, b, c AND d DIRECTION,
VALUE FOR EACH DIRECTION IS 1 WHEN 0 · 1 · 0,
SUM OF EACH VALUE IS KA1 [V] [H]

KA1 [V] [H] = a+b+c+d     : ISOLATION AMOUNT KA1 [V] [H] IS 0 TO 4

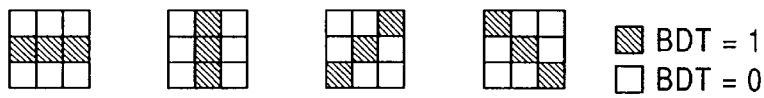

▨ BDT = 1
☐ BDT = 0

HOWEVER, WHEN PATTERN IS ONE OF THESE FOUR PATTERN,
KA1 [V] [H] = 0

FIG. 11B

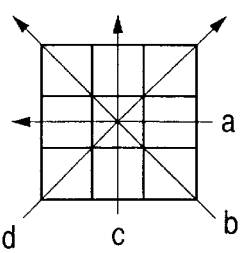

BDT IS REFERRED IN EACH OF a, b, c AND d DIRECTION,
VALUE FOR EACH DIRECTION IS 1 WHEN 1 · 0 · 1,
SUM OF EACH VALUE IS KA0 [V] [H]

KA0 [V] [H] = a+b+c+d     : ISOLATION AMOUNT KA0 [V] [H] IS 0 TO 4

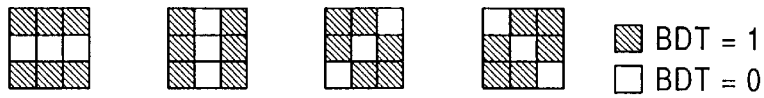

▨ BDT = 1
☐ BDT = 0

HOWEVER, WHEN PATTERN IS ONE OF THESE FOUR PATTERN,
KA0 [V] [H] = 0

OBTAIN SUM OF TWO PIXEL IN dn DIRECTION

FIG. 18
REMARKABLE PIXEL POSITION BDT [V] [H]
REMARKABLE PIXEL POSITION BDT [V] [H]
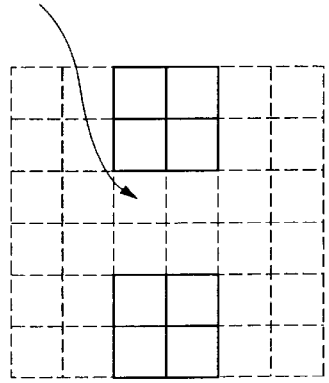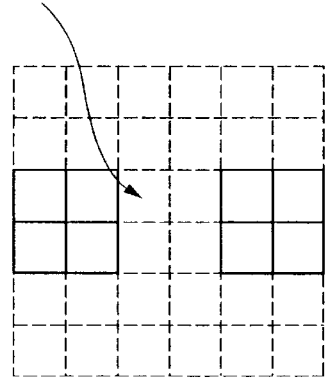
□ PIXEL WHEN BDT = 0   ⌐ ¬ DONT CARE
WHEN PIXEL WHEN BDT = 0 IS COINCIDENT WITH ONE OF THESE TWO PATTERN, KRTV [V] [H] = KRTH [V] [H] = 0
FIG. 19
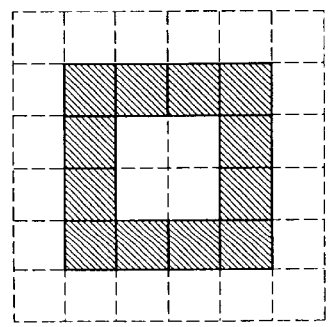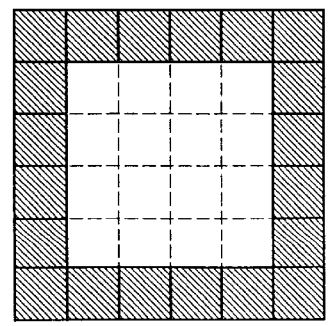
▨ PIXEL WHEN BDT = 1   ⌐ ¬ PIXEL WHEN BDT = 0

OBTAIN SUM OF THREE PIXEL IN dn DIRECTION

OBTAIN SUM OF THREE PIXEL IN dnn DIRECTION

OBTAIN SUM OF FIVE PIXEL IN dKnn DIRECTION

OBTAIN SUM OF THREE PIXEL IN dnnn DIRECTION

OBTAIN SUM OF SEVEN PIXEL IN dnnn DIRECTION

WHEN THERE IS KBDET AS SHOW IN THESE FIGURE,
MJIDET = 1 AS TO REMARKABLE PIXEL(*)

WHEN THERE IS KBDET AS SHOW IN THIS FIGURE,
MJIDET = 0 AS TO REMARKABLE PIXEL(*)

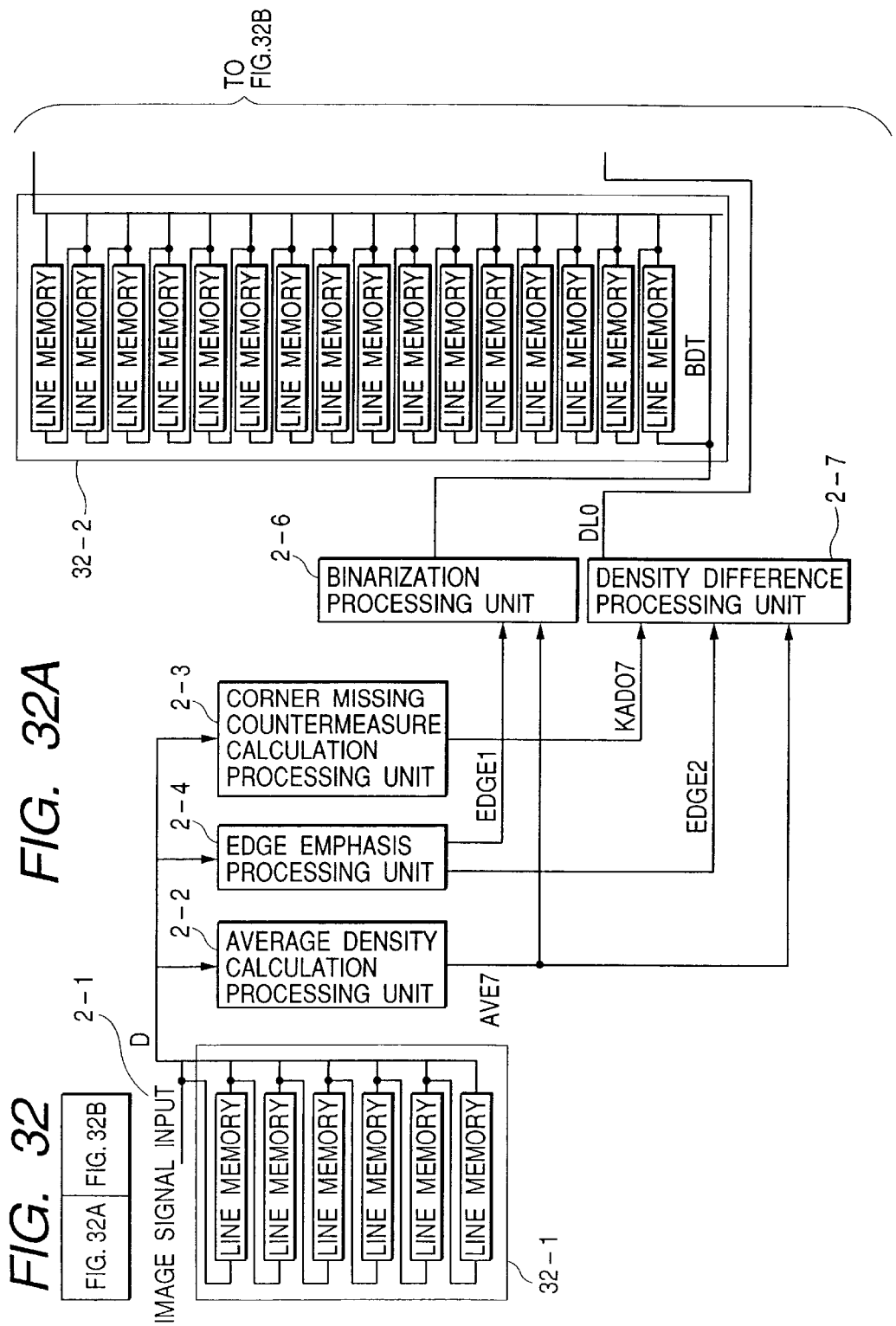

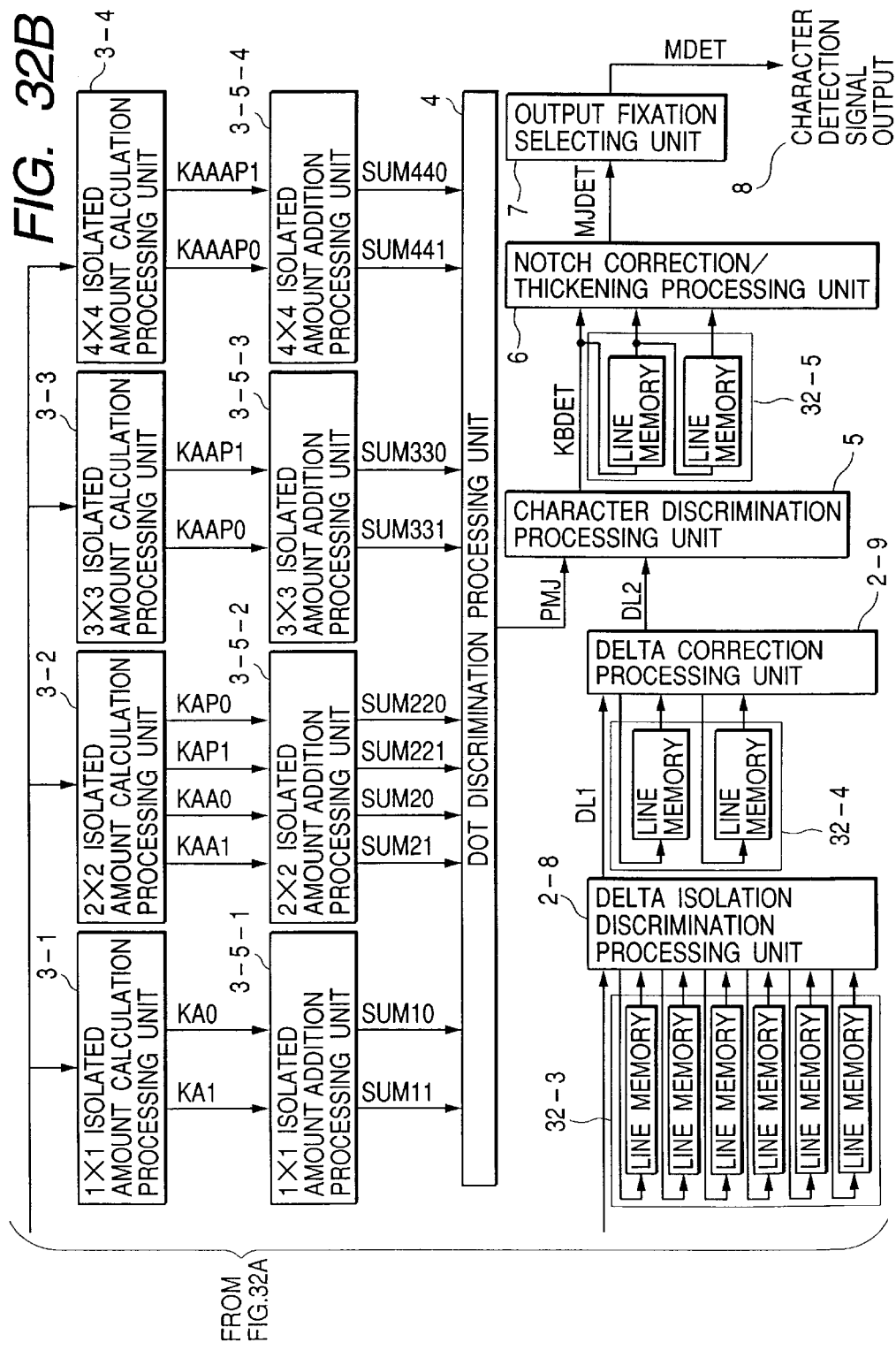

1×1 ISOLATED AMOUNT CALCULATION ADDITIONAL AREA

2×2 ISOLATED AMOUNT CALCULATION ADDITIONAL AREA

3×3 ISOLATED AMOUNT CALCULATION ADDITIONAL AREA

4×4 ISOLATED AMOUNT CALCULATION ADDITIONAL AREA

ADDITION RESULT

ADDITION RESULT

IMAGE PROCESSING APPARATUS AND IMAGE PROCESSING METHOD

BACKGROUND OF THE INVENTION

1. Field of the Invention

The present invention relates to image processing apparatus and method having a function to discriminate a characteristic of an input image, especially a character/line image area, a dot area and the like.

2. Related Background Art

Conventionally, in a case where an original in which characters and dot images are mixed is copied by a copy machine or the like, an input signal from a scanner unit is subjected to various processes and then output. For example, a character portion is intended to be sharply output, input image data is subjected to a filtering process to apply sharpness to that portion. However, if a dot image portion is subjected to the filtering process in the same manner, moire occurs on that portion. Therefore, such the copy machine is structured to provide plural copy modes such as a mode attaching importance to character reproducibility, a mode attaching importance to dot image reproducibility and the like, and to perform the filtering process according to each copy mode.

In a color copy machine, there is a type in which a character area and a dot image area are separated in the unit predetermined block, and the filtering process is changed over according to the separated area.

However, in the above color copy machine, even if an achromatic color image is read by a scanner, color aberration occurs due to mechanical vibration, chromatic aberration of a lens, difference in MTF and the like. Thus, there is a problem that an edge portion of an achromatic color is output as a chromatic color portion, or the like, thereby causing deterioration in image quality.

Especially, it is difficult to discriminate the dot area and the character area from each other. Thus, there are problems that the dot is edge-emphasized by erroneously discriminating the dot area as the character area, the character is smoothed by erroneously discriminating the character area as the dot area contrarily, and the like.

Further, since the image area separation performed in the conventional color copy machine is based on the discrimination in the unit of block, the erroneous discrimination between the dot image portion and the character image portion also happens in the unit of block, thereby causing deterioration in image quality.

Furthermore, a number of memories and process blocks are necessary to perform such a conventional image area separating process, thereby causing cost increase of the copy machine itself.

SUMMARY OF THE INVENTION

Therefore, an object of the present invention is to effectively and accurately detect a characteristic of an image.

Especially, an object of the present invention is to successfully discriminate a dot area and a character image area from each other.

A further object of the present invention is to provide a new function.

In order to achieve the above objects, in one preferred embodiment of the present invention, there is provided an image processing apparatus for extracting an image portion of a predetermined attribute from among an image including plural image portions respectively having different attributes, the apparatus comprising: a calculating means for calculating an isolated amount of a pixel value in each of plural areas respectively having different sizes; an integrating means for integrating the calculated isolated amount in a predetermined area; and an extracting means for extracting the image portion of the predetermined attribute according to the integrated isolated amount.

The above and other objects of the present invention will become apparent from the following embodiments and the accompanying drawings.

BRIEF DESCRIPTION OF THE DRAWINGS

FIG. 1 is comprised of FIGS. 1A and 1B are block diagrams showing an entire signal process according to a first embodiment of the present invention;

FIGS. 2A and 2B are diagrams showing one example of space filter coefficients;

FIGS. 7A, 7B and 7C are diagrams showing one example of filter coefficients used to detect the edge components in an edge emphasizing process;

FIGS. 9A and 9B are diagrams showing reference pixels respectively used to eliminate isolated pixels;

FIG. 10 is a diagram for explaining delta correction;

FIGS. 11A and 11B are diagrams for explaining methods to calculate an isolated amount;

FIG. 18 is a diagram showing patterns to judge the dot area;

FIG. 19 is a diagram showing patterns to judge the dot area;

FIG. 32 is comprised of FIGS. 32A and 32B are block diagrams showing a hardware structure to realize the process shown in FIG. 5;

Figure 3:
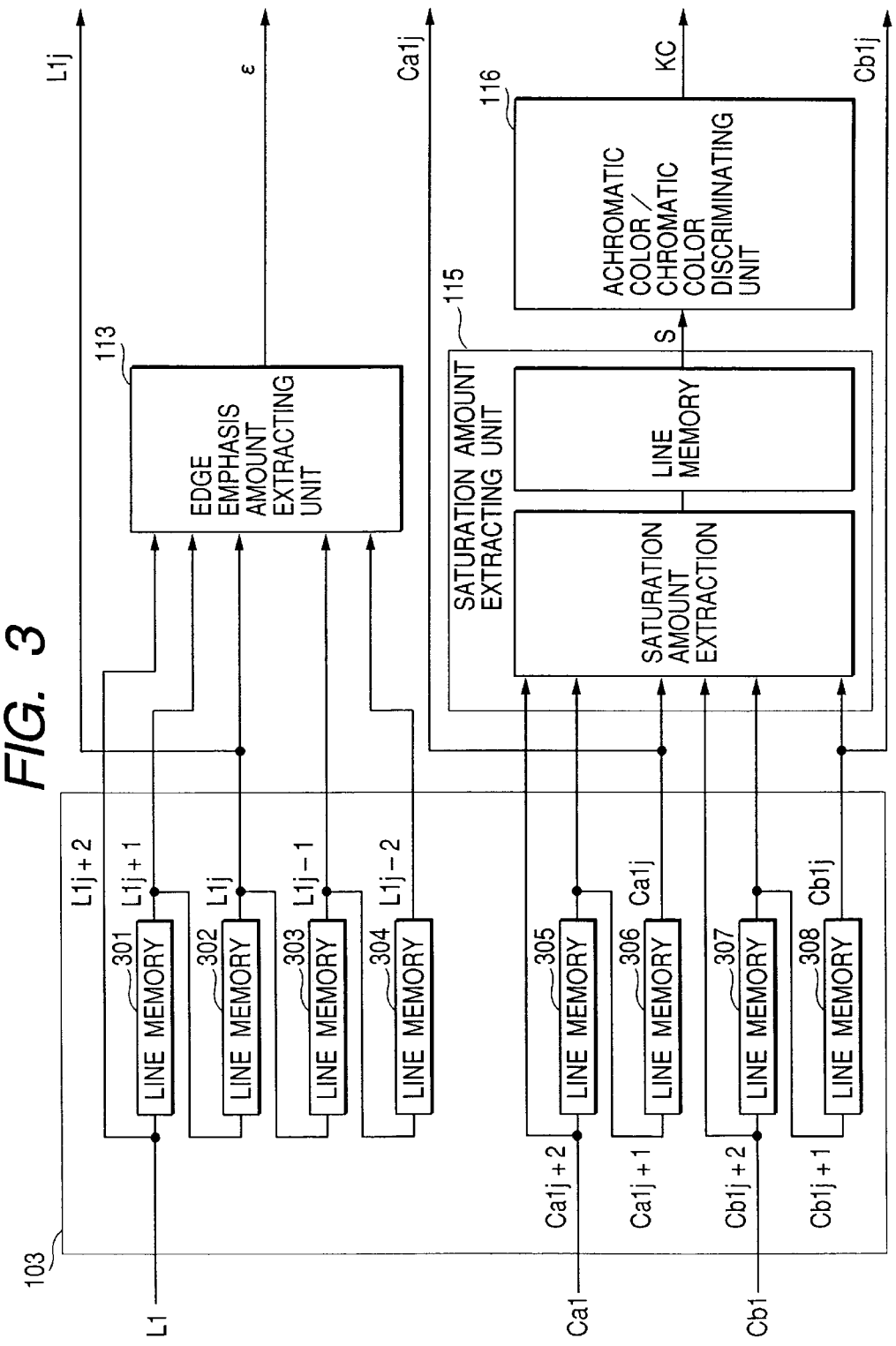
FIG. 3 is a block diagram showing circuits in the vicinity of a delay unit 103.

DETAILED DESCRIPTION OF THE PREFERRED EMBODIMENTS (First Embodiment)

An embodiment of image processing apparatus and method according to the present invention will be explained with reference to a concrete example concerning an image process in a color copy machine.

FIGS. 1A and 1B are block diagrams for explaining the entirety of the image process.

In FIG. 1A, numeral 101 denotes a color image input means such as an image reader unit of the color copy machine or the like. The color image input means 101 may include an original image reading device such as a color image scanner or the like, widely an image input unit from a computer, and the like, and acts as the image input unit of a color image processing apparatus according to the present invention. The input means 101 outputs three color separation signals R1, G1 and B1 obtained by separating a color of each pixel in a color image into R (red), G (green) and B (blue).

The signal G1 which is one of the three color separation signals R1, G1 and B1 of the color image input by the color image input unit 101 is then input to a character/image discriminating unit 111. The unit 111 discriminates for each pixel whether the remarkable pixel represents a line image such as a character, a fine line or the like, or a continuous gradation image such as a photographic image, a print image or the like, and then outputs a character/image discriminating signal TI. Further, the signal TI is input to a space filter coefficient storing unit 112. When the remarkable pixel is the line image, a character space filter coefficient 201 shown in FIG. 2A is selected. On the other hand, when the remarkable pixel is the continuous gradation image, an image space filter coefficient 202 shown in FIG. 2B is selected. Then, a space filter coefficient KJ for the character or image is output from the storing unit 112.

The three color separation signals R1, G1 and B1 of the color image are input to a first color space converting unit 102 to be converted into a lightness signal L1 representing lightness and chromaticity signals (Ca1, Cb1) representing tints.

A formula (1) represents an example of a conversion formula to simply convert the signals R1, G1 and B1 into the lightness signal L1 and the chromaticity signals (Ca1, Cb1).

$$L1=(R1+2G1+B1)/4$$

$$Ca1=(R1-G1)/2$$

$$Cb1=(R1+G1-2B1)/4 \qquad (1)$$

The lightness signal L1 and the chromaticity signals (Ca1, Cb1) converted by the converting unit 102 are then input to a delay unit 103. In the unit 103, the signals of N lines are stored for the lightness signal L1 and the signals of N/2 lines are stored for the chromaticity signals (Ca1, Cb1). More concretely, in case of performing a space filtering process of 5×5 pixels as above, the signals of four lines for the lightness signal L1 and the signals of two lines, i.e., half of four lines, for the chromaticity signals (Ca1, Cb1) are stored and delayed in the delay unit 103.

Hereinafter, the delay unit 103 of the present invention, and its peripheral circuits, i.e., an edge emphasis amount extracting unit 113, a saturation amount extracting unit 115 and an achromatic color/chromatic color discriminating unit 116, will be explained in detail with reference to FIG. 3. In the delay unit 103, for the lightness signal L1 output from the converting unit 102, the signals of four lines are stored by line memories 301 to 304. To synchronize with the central pixel of the lightness signal, for the chromaticity signal Ca1, the signals of two lines are stored by line memories 305 and 306, and for the chromaticity signal Cb1, the signals of two lines are stored by line memories 307 and 308. If the central line is assumed to be a j line, then j−2, j−1, j and j+1 lines are stored for lightness. Thus, the lightness signal of five lines including a current j+2 line is input to the edge emphasis amount extracting unit 113.

On the other hand, the chromaticity signal Ca1 of which j, j+1 and j+2 lines were delayed by the line memories 305 and 306 in the delay unit 103 is input to the saturation amount extracting unit 115, and similarly the chromaticity signal Cb1 is input to the unit 115. Also, chromaticity signals Ca1j and Cb1j of which phases are coincident with that of the lightness signal L1j are input to the edge emphasis unit 104.

The lightness signal L1 delayed by the delay unit 103 represents the data of total five lines, i.e., delayed four lines and current one line, and is input to the edge emphasis extracting unit 113. Then, an edge emphasis amount ε is extracted by using the space filter coefficient KJ for the character or image selected according to the character/image discriminating signal TI.

On the other hand, the chromaticity signals (Ca1, Cb1) delayed by the delay unit 103 are input to the saturation amount extracting unit 115 to generate a saturation signal S representing vividness in color. In this case, initially, an averaging process of 3×3 area is performed by referring to the chromaticity signals Ca1 and Cb1 input to the unit 115 and each corresponding to three lines, to calculate chromaticity signals Ca1'j+1 and Cb1'j+1.

Further, the saturation signal S can be obtained by a following formula (2).

$$Sj+1 = (Ca1'j+1^2 + Cb1'j+1^2)^{0.5} \qquad (2)$$

Since the phase of the calculated signal S acts as the detection signal for the phase of the j+1 line, the signal obtained by delaying the detection signal by one line is generated, whereby the saturation signal S corresponding to the phase of the j line is output to the achromatic color/chromatic color discriminating unit 116. In this case, when the saturation is calculated by using a two-dimensional area of 3×3 area, it is possible to perform saturation discriminating in which influence due to expansion of the saturation is suppressed in a color aberration area of a black character edge portion produced by vibration in a reading system or the like. Therefore, it prevents that the color aberration portion of the black character edge is erroneously discriminated as a chromatic color portion by the later-described achromatic color/chromatic color discriminating unit 116.

The achromatic color/chromatic color discriminating unit 116 receives the input saturation signal S, discriminates whether the remarkable pixel represents black/white (achromatic color) or color (chromatic color), and outputs a discriminating signal KC.

The remarkable pixel is discriminated as it represents black/white (achromatic color) when the saturation signal S is low in level, while the pixel is discriminated as it represents color (chromatic color) when the signal S is high in level. That is, the discriminating signal KC is determined based on a formula (3) by using a predetermined threshold ρ.

(when $S<\rho$)$KC=0$ achromatic color (when $\rho \leq S$)$KC=1$ chromatic color  (3)

An edge emphasis amount distributing unit 114 receives the edge emphasis amount ε, the saturation signal S and a discriminating signal TC from a black character/color character/image discriminating unit 117, performs such processes as follows according to the received signals, and thus determines an edge emphasis correction amount ε1 for the lightness signal L1 and an edge emphasis correction amount εc for the chromaticity signals (Ca1, Cb1).

In the edge emphasis correction amount ε1 for the lightness signal L1, as the value of the saturation signal S becomes low (close to achromatic color), distribution of the edge emphasis amount ε for the lightness signal is made large. For this reason, the entire edge emphasis amount ε is allocated or distributed to the edge emphasis correction amount ε1 for the pixel (TC=0) from which the signal representing that such the pixel was discriminated as the black character portion is generated.

Contrary to the edge emphasis correction amount for the lightness signal, in the edge emphasis correction amount εc for the chromaticity signals (Ca1, Cb1), as the value of the saturation signal S becomes high (vivid color), distribution of the edge emphasis amount ε for the chromaticity signal is made large. For this reason, any edge correction is not performed for the pixel (KC=0) from which the achromatic color signal is generated, and further the chromaticity signal for such the remarkable pixel is eliminated (i.e., setting Ca2=Cb2=0).

Such the operation is based on a tendency that, in the image processing apparatus such as the color copy machine or the like, visible image quality is remarkably degraded if the color component remains in the copied image of the black character or the like. Therefore, it is necessary for such the pixel to perform the color correction by cutting the color component to obtain the complete achromatic color signal.

The edge emphasis correction amounts ε1 and εc generated as above are input to an edge emphasis unit 104, together with the signals L, Ca and Cb. In the unit 104, the edge emphasis correction amount ε1 is added to the lightness signal L, and the chromaticity signals (Ca, Cb) are multiplied by the edge emphasis correction amount εc.

$$L2 = \epsilon 1 + L1$$

$$Ca2 = \epsilon c \times Ca1$$

$$Cb2 = \epsilon c \times Cb1 \qquad (4)$$

As can be understood from the formula (4), when the edge emphasis correction amount ε1 is added to the signal L, the lightness is preserved in the pixel (ε1=0) in which, since the saturation is high, the lightness is not intended to be edge-emphasized. On the other hand, when the signals Ca and Cb are multiplied by the edge emphasis correction amount εc, for the pixel which can be considered to be achromatic color because its saturation is low, the chromaticity component of the remarkable pixel itself is eliminated by multiplying the amount εc=0.

Signals L2, Ca2 and Cb2 edge-emphasized as above are input from the edge emphasis unit 104 to a second color space converting unit 105, and then reverse-converted again into the signals R, G and B.

A formula (5) represents an example of a conversion formula for converting the lightness and chromaticity signals L2, Ca2 and Cb2 into three color separation signals R2, G2 and B2, and represents inverse conversion coefficients against the formula (1).

$$R = (4L + 5Ca + 2Cb)/4$$

$$G = (4L - 3Ca + 2Cb)/4$$

$$B = (4L + Ca - 6Cb)/4 \qquad (5)$$

The three color separation signals R2, G2 and B2 obtained by the inverse conversion are input to a luminance/density converting unit 106, and converted into density signals C1, M1 and Y1 through logarithmic conversion or the like.

A black character/color character/image discriminating unit 117 outputs the discriminating signal TC based on each of the discriminating signal TI from the character/image discriminating unit 111 and the discriminating signal KC from the achromatic color/chromatic color discriminating unit 116. In other words, the unit 117 outputs the black character discrimination (TC=0) when the signals TI and KC represent the character portion and the achromatic color portion, outputs the color character discrimination (TC=1) when the signals TI and KC represent the character portion and the chromatic color portion, and outputs the image portion discrimination (TC=2) in other cases, i.e., when the signal TI from the unit 111 represents a non-character portion.

The density signals C1, M1 and Y1 are input to a color correction unit 107 which generates a black signal K and performs color processes such as color correction and the like. Then, the unit 107 outputs density signals C2, M2, Y2 and K2. The process at this time is as follows. That is, according to the discriminating signal TC representing the discriminating result of the black character/color character/ image discriminating unit 117, the color correction unit 107 performs 100% under color removal (UCR) when the remarkable pixel is the black character portion, extracts a black component by using lowest-level one of the density signals C1, M1 and Y1 as the black density signal K2, and calculates each density signal value according to a formula of C2=C1−K2, M2=M1−K2 and Y2=Y1−K2. If the discriminating signal representing the black character portion is output on the processing pixel, the values of the signals Ca2 and Cb2 are set to be zero by the edge emphasis unit 104. Therefore, R2=G2=B2 is obtained by the second color space converting unit 105, and C1=M1=Y1 is obtained by the luminance/density converting unit 106. When such the signal values are input to the color correction unit 107, K2=C1=M1=Y1 and C2=M2=Y2=0 are obtained, whereby the processing pixel is converted into the pixel consisting of black single color.

Further, in a case where the image signal is read by an RGB three-line CCD sensor, each read signal is delayed according to an offset position of the three-line sensor to register phases of the read signals at the same pixel position. However, misregistration (or positional aberration) of the read images happens due to uneven scanning speed, vibration and the like in the reading system. Thus, for example, false color appears at the edge portion of the black character signal due to color aberration in the signals R, G and B.

Figure 4A:
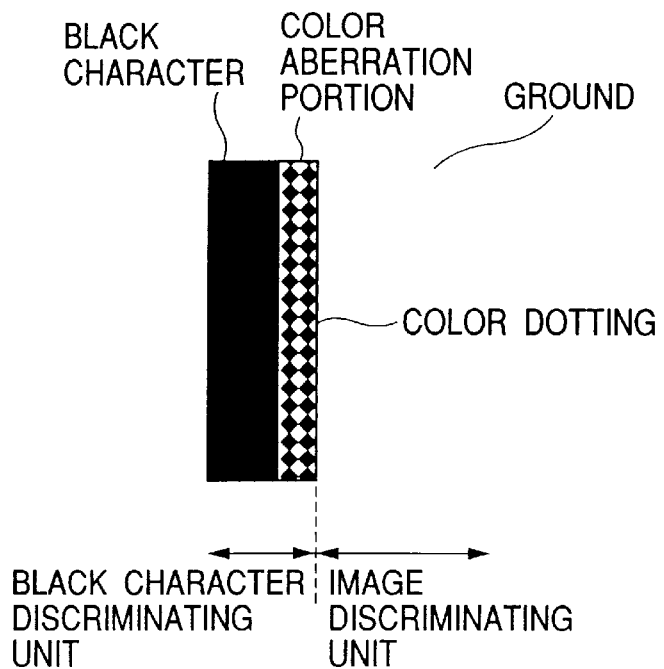
FIGS. 4A and 4B are diagrams for explaining a state of color aberration.

Therefore, if the signal representing the black character portion is merely output only inside the character, the color aberration portion located outside the character edge is not converted into the black single color as shown in FIG. 4A, whereby color dots are formed thereon. Thus, reproducibility of the black character is remarkably degraded.

Figure 4B:
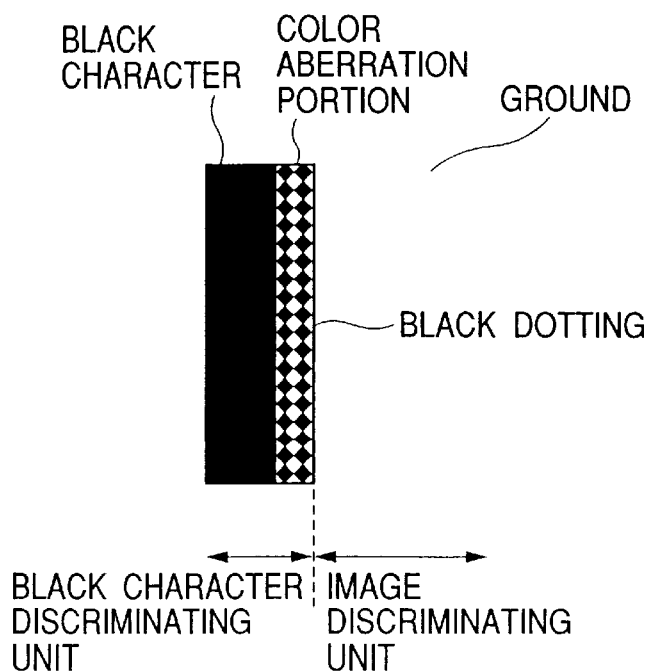

For this reason, as shown in FIG. 4B, the signal representing the black character portion must be output not only inside the character but also outside the character. Thus, since the color aberration portion located outside the edge is converted into the black single color, it suppress that the color dots are formed on such the color aberration portion, thereby improving the reproducibility of the black character. Although the details of the character discriminating signal output by the character/image discriminating unit 111 will be described later, the character discriminating signal is output such that the discrimination represented by the signal contains peripheral pixels of the character portion. The pixels at the black character peripheral portion are discriminated as it represents the achromatic color by using the two-dimensional area of 3×3 area. Thus, the pixel is discriminated as the achromatic color pixel even at the pixel position where the color aberration happens, whereby it is possible to prevent that the color dots are formed at the black character peripheral portion.

Numeral 110 denotes a color image output unit which is composed of an image recording apparatus such as an electrophotographic-system printer, an inkjet-system printer or the like.

When the color image output unit 110 is a binary printer or the like, the density signals C2, M2, Y2 and K2 are converted respectively into binary image signals C3, M3, Y3 and K3 by a binarizing unit 108. As a binarizing method, there are various methods such as an error diffusion method, a dither method and the like. Thus, a binarizing process is performed in the method suitable for each apparatus.

When the image is output by the electrophotographic-system printer, by inputting the discriminating signal TI from the character/image discriminating unit 111, it may perform the binarizing on the character portion in the error diffusion method having excellent character reproducibility, and perform multivalue recording on the image portion by outputting multivalue signals and using pulse width modulation (PWM).

Further, when resolution of the image input from the color image input unit 101 is different from that of the image output by the color image output unit 110, the binary image signals C3, M3, Y3 and K3 are subjected to a resolution converting process by a smoothing/resolution converting unit 109 to generate signals C4, M4, Y4 and K4. Especially, when the resolution of the image formed by the output unit 110 is higher than that of the image formed by the input unit 101, a smoothing process is performed to smoothly interpolate a contour portion of the image, and then the obtained image is printed and/or recorded by the output unit 110.

Figure 5:
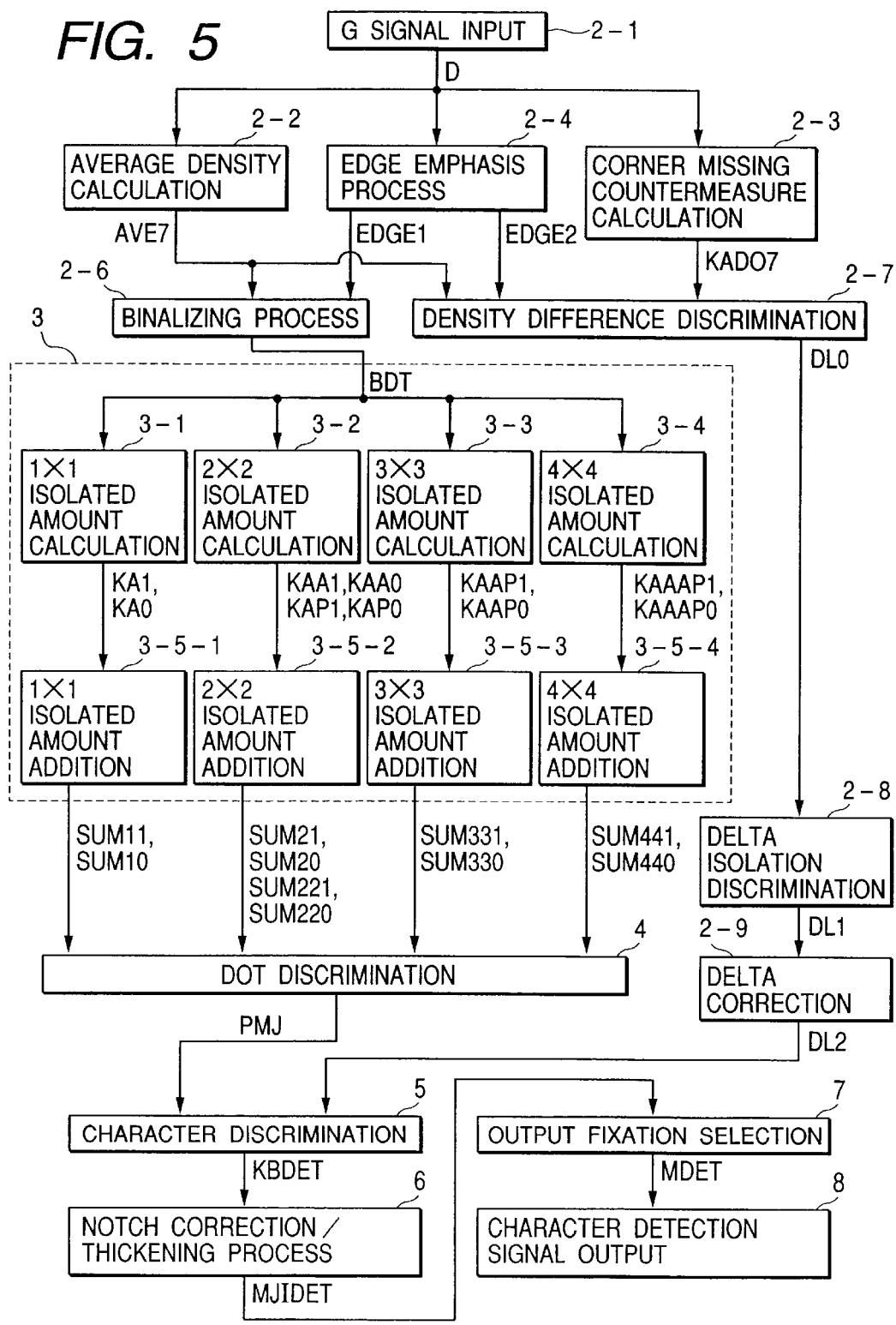
FIG. 5 is a flow chart showing a process by a character/image discriminating unit 111.

FIG. 5 is a flow chart showing the details of the process performed by the character/image discriminating unit 111 in FIG. 1A. In FIG. 5, numeral 2-1 denotes an input step of the signal G in which the signal G1 in FIG. 1A is rendered as the input signal. In the present embodiment, the signal G1 is the multivalue data of eight bits and 256 gradations. However, as the signal to be input to the discriminating unit 111 is not limited to such the eight-bit signal. That is, in the present embodiment, by using upper six bits of the signal G1 as the input signal to be processed by the discriminating unit 111, the processing time is shortened and also the circuit is made on a reduced scale without remarkably degrading discrimination accuracy. The number of bits of the input signal to be processed by the discriminating unit 111 is not limited to this. That is, it is apparent that such the number of bits should be selected according to the required discrimination accuracy and processing speed.

Hereinafter, the details of the process will be explained according to the flow shown in FIG. 5.

(2-1) Signal G1 Input

The upper six bits of the input eight-bit signal G1[V][H] is managed as the discriminating signal D[V][H].

$$D[V][H]=G1[V][H]/4$$

Here, the characters V and H represent coordinates of the input signal G1 on an original. A V direction represents a moving direction (i.e., sub scanning direction) of the CCD sensor, and an H direction represents a pixel arranging direction (i.e., main scanning direction) of the CCD sensor.

(2-2) Average Density Calculation

In this step, as to the upper six bits of the input signal G1, the value added with 49 pixels of the 7×7 area including the remarkable pixel as its center is calculated. Then, the above-calculated value is further divided by 16 to calculate AVE7[V][H].

$$AVE7[V][H] = (1/16) \cdot \sum_{X=-3}^{3} \sum_{y=-3}^{3} D[V+x][H+y]$$

where $0 \leq AVE7 \leq 192$ (2-3) Corner Missing Countermeasure Calculation

Figure 6A:
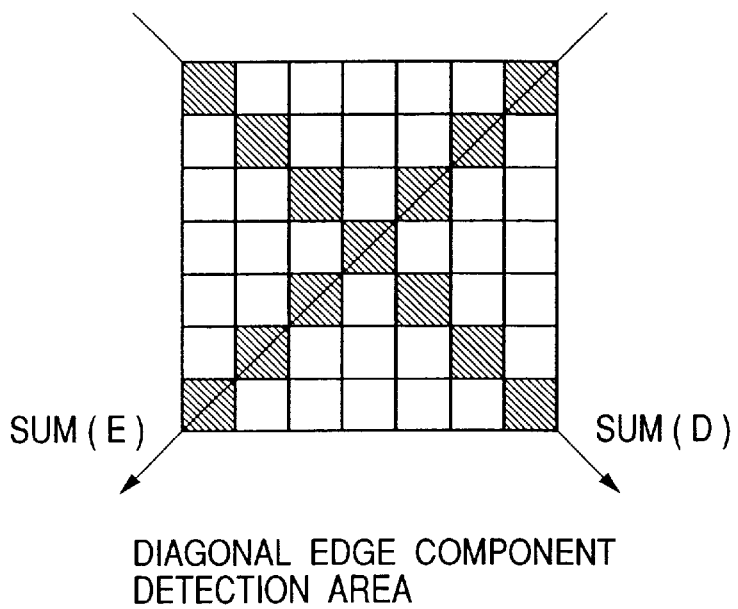
FIGS. 6A and 6B are diagrams showing examples of detection areas of edge components.
Figure 6B:
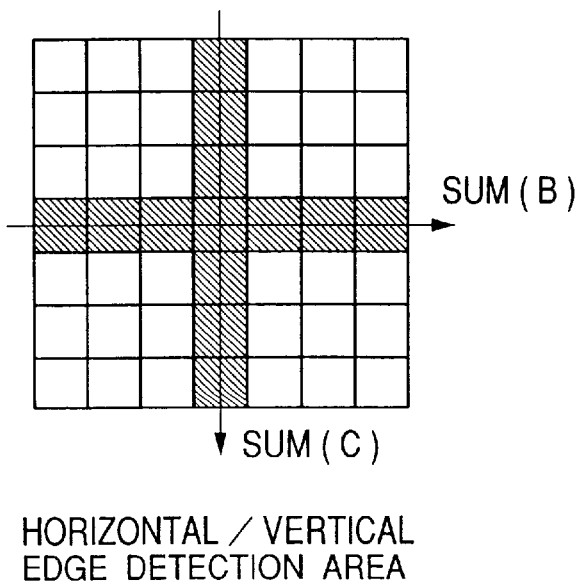

The addition value of the signal D[V][H] is calculated in longitudinal, lateral and diagonal directions of the following 7×7 area, and its maximum value is output as KADO7[V][H]. FIGS. 6A and 6B show the areas sum(B), sum(C) and sum(E) calculated in the 7×7 area.

Sum(B)={D[V][H−3]+D[V][H−2]+D[V][H−1]+D[V][H+1]+D[V][H+2]+D[V][H+3]}

Sum(C)={D[V−3][H]+D[V−2][H]+D[V−1][H]+D[V+1][H]+D[V+2][H]+D[V+3][H]}

Sum(D)={D[V−3][H−3]+D[V−2][H−2]+D[V−1][H−1]+D[V+1][H+1]+D[V+2][H+2]+D[V+3][H+3]}

Sum(E)={D[V+3][H−3]+D[V+2][H−2]+D[V+1][H−1]+D[V−1][H+1]+D[V−2][H+2]+D[V−3][H+3]}

KADO7[V][H]={Max(sum(B), sum(C), sum(D), sum(E))+D[V][H]}×7/16 where 0≦KADO7≦192.

Max(sum(B), sum(C), sum(D), sum(E)) represents the maximum values in the values sum(B), sum(C), sum(D) and sum(E), respectively.

(2-4) Edge Emphasis Process

In this step, by referring to the data of the areas in the periphery of the remarkable pixel, the edge components are extracted by using the 5×5, 3×3 and 7×7 areas. Thus, these components are added to the remarkable pixel in predetermined intensity to perform the edge emphasis process of the remarkable pixel.

Calculation formulas to extract the edge components are shown as follows. In this case, symbols KOM[x][y], KM1[x][y], KM2[x][y] and KM3[x][y] represent filter coefficients for extracting the respective edge components. FIGS. 7A to 7C respectively show examples of these coefficients.

When the edge component is extracted by a 5×5 filter (EDD55):

$$EDD55 = \sum_{x=-2}^{2}\sum_{y=-2}^{2}\{D[V+x][H+y] \times KM0[x][y]\}$$

When the edge component is extracted by a 3×3 filter (EDD33V, EDD33H):

$$EDD33V = \sum_{x=-1}^{1}\sum_{y=-1}^{1}\{D[V+x][H+y] \times KM1[x][y]\}$$

$$EDD33H = \sum_{x=-1}^{1}\sum_{y=-1}^{1}\{D[V+x][H+y] \times KM2[x][y]\}$$

When the edge component is extracted by a 7×7 filter (EDD77):

$$EDD77V = \sum_{x=-3}^{3}\sum_{y=-3}^{3}\{D[V+x][H+y] \times KM3[x][y]\}$$

Each edge component calculated by the above formula is multiplied by a predetermined gain and then added to the remarkable pixel, thereby performing the edge emphasis process of the remarkable pixel.

The calculation formulas are shown as follows.

EDGE1[V][H]=D[V][H]+EDD55×EDKYD0+EDD33V×EDKYD1+EDD33H×EDKYD2 where EDGE1=255 when EDGE1>255, and EDGE1=0 when EDGE1<0

EDGE2[V][H]=D[V][H]+EDD55×EDKYD3+EDD77×EDKYD4 where EDGE2=511 when EDGE2>511, and EDGE2=−512 when EDGE2<−512.

Each of the symbols EDKYD0 to EDKYD4 represents the gain for each edge extracting value, and the gain is set to correct an MTF characteristic of the input signal G1. Especially, each of ED33V and ED33H is the value calculated the edge amount independently in the main and sub scanning directions in the 3×3 area, and each of the coefficients EDKYD1 and EDKYD2 to be multiplied to each of ED33V and ED33H is the value set to correct the difference in the MTF in each of the main and sub scanning directions.

Further, EDGE1[V][H] to be input in a later-described binarizing process (2-6) is clipped at the values from 0 to 255, and EDGE2[V][H] is clipped at the values from −512 to 511.

(2-6) Binarizing Process

EDGE1[V][H] which was edge-emphasized in the edge emphasis process step (2-4) is compared with AVE7[V][H] calculated in the averaging density calculation step (2-2) to calculate the binarizing signal BDT[V][H].

When (EDGE1[V][H]×49)/16<AVE7[V][H], BDT[V][H]=1 is obtained.

When (EDGE1[V][H]×49)/16≧AVE7[V][H], BDT[V][H]=0 is obtained.

In this step, the addition value of the 49 pixel data of the 7×7 area is divided by 16 to calculate AVE7[V][H]. Thus, the left term of each of the above formulas represents the value obtained when EDGE1[V][H] is multiplied by 49 and then divided by 16. Thus, the binarizing calculation in this step is equivalent to the operation to binarize the edge-emphasized remarkable pixel value EDGE1[V][H] by using the average pixel value of the 7×7 area as the threshold. In this case, to easily realize hardware structure by applying the operation that division other than bit shifting is not performed, the above formulas are used.

Further, in this step, if AVE7[V][H] is equal to (EDGE1[V][H]×49)/16, the value of BDT[V][H] is set to be "0". This represents that the value of BDT[V][H] always has the value "0" in the uniform-density area. The pixel satisfies BDT[V][H]=1, when EDGE1[V][H] is smaller than the average value of the signals D in the peripheral area. This represents the case where the remarkable pixel is darker in lightness as compared with the average density. If the pixel has the edge component in the darker direction, BDT[V][H]=1 is obtained, while if not, BDT[V][H]=0 is obtained.

(2-7) Density Difference Discrimination

In the density difference discrimination, magnitude of the density difference between EDGE2[V][H] output in the edge emphasis process step (2-7) and the peripheral area is discriminated. If the difference is larger than a predetermined density difference, DL[V][H]=1 is output, while if not larger, DL[V][H]=0 is output.

Formulas in this step are shown as follows.

(discrimination 1)

When AVE7[V][H]−(EDGE2[V][H]×49)/16>NOUDOIN, ENOUD0[V][H]=1 is obtained.

When (EDGE2[V][H]×49)/16−AVE7[V][H]>NOUDOOUT, ENOUD0[V][H]=1 is obtained.

In other cases, ENOUD0[V][H]=0 is obtained. where NOUDOIN and NOUDOOUT are setting values.

(discrimination 2)

When KADO7[V][H]−(EDGE2[V][H]×49)/16>NOUDOINK, KADO[V][H]=1 is obtained.

When (EDGE2[V][H]×49)/16−KADO7[V][H]>NOUDOOUTK, KADO[V][H]=1 is obtained.

In other cases, KADO[V][H]=0 is obtained. where NOUDOINK and NOUDOOUTK are setting values.

DL0[V][H]=ENOUDO[V][H] or KADO[V][H]

As explained in the step (2-4), EDGE2[V][H] is calculated to have both the positive and negative values. Thus, NOUDOOUT is set as the threshold for the positive edge component, and NOUDOIN is set as the threshold for the negative component. Therefore, the threshold value can be set independently for each of the edge area where the lightness becomes higher and the edge area where the lightness becomes lower, whereby the discrimination to obtain ENOUDO[V][H]=1 can be performed for each of the inside- and outside-areas of the character area.

Subsequently, the discrimination 2 will be explained.

Figure 8A:
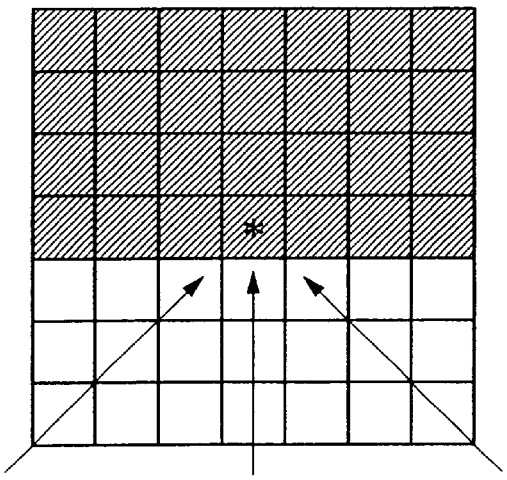
FIGS. 8A and 8B are diagrams for explaining density difference discrimination.
Figure 8B:
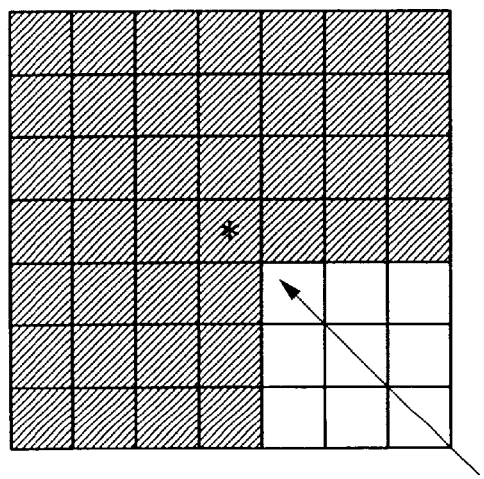

The above discrimination 2 shows the discrimination formulas used in the discrimination to compensate deterioration of the edge component at the corner portion in the character/line image area. FIGS. 8A and 8B show the pixel arrangement of the edge portion.

In the above discrimination 1, the level difference between the edge-emphasized remarkable pixel value EDGE2[V][H] and the average pixel value of its peripheral areas is binarized to discriminate whether or not the density difference component is large. However, in the case where the pixels of the same lightness are arranged as shown in FIGS. 8A and 8B, since the edge component of FIG. 8A calculated in the step (2-4) is larger than that of FIG. 8B, the case where the edge pixels in FIG. 8B can not be detected in the discrimination 1 happens. The discrimination to avoid such inconvenience is the above discrimination 2. In the step (2-3), the density difference between the maximum value component in the addition values of the longitudinal, lateral and diagonal components of the calculated 7×7 area, and the edge-emphasized remarkable pixel value EDGE2[V][H] is discriminated, whereby it becomes possible to discriminate that the density difference between the edge-emphasized remarkable pixel and its peripheral pixels is large even in the case of FIG. 8B.

(2-8) Delta Isolation Discrimination (Isolation Discrimination of DL0[V][H], Elimination of Isolated DL0[V][H]=1)

Based on DL0[V][H] output in the density difference discrimination step (2-7), the process to eliminate the isolated DL0[V][H] is performed. FIG. 9A shows an example of the area used in the isolation elimination. In this example, the 7×7 area is used. That is, when the pixel of DL0=1 does not exist at the outermost-periphery pixel position in FIG. 9A, the value of DL0 in the inward 5×5 area is forcedly replaced by "0" to obtain DL1[V][H]=DL0[V][H] as the corrected result for the remarkable pixel, whereby the isolation-eliminated result of DL0[V][H] is output as DL1 [V][H]. According to this process, the density difference discriminating result for the pixel of DL0=1 isolated in the area smaller than the 5×5 area can be replaced by the discriminating result representing that the difference value is smaller than a predetermined value. In this step, the area to be referred to is not limited to the 7×7 area, but may be replaced according to performance required by the system. FIG. 9B shows an example that the 5×5 area is used as such the referring area.

In this case, the pixel of DL0=1 existing in the area smaller than the 3×3 area is replaced by the pixel of DL0=0.

(2-9) Delta Correction (Correction of Discontinuous Portion of DL1[V][H] in 3×3 Area)

In this step, the discontinuous portion of DL1[V][H] being the result of the delta isolation discrimination in the step (2-8) is corrected by referring to the 3×3 area, to output DL2[V][H] as the result of the correction.

FIG. 10 shows the arrangements of DL1 in the case where the above correction is performed. In FIG. 10, the pixel positions in black represent the pixels of DL1=1. If the pixels are coincident with any of the four patterns in FIG. 10, DL2[V][H] being the corrected result of the remarkable pixel position is DL2[V][H]=1 irrespective of the value of DL1[V][H]. On the other hand, if not coincident, DL2[V] [H]=DL1[V][H] is obtained.

DL2[V][H] calculated as above represents the result of the operation in which, based on the pixel position where the level difference between the remarkable pixel and the average value of the pixel values in its peripheral areas is larger than the predetermined value, the isolated point is eliminated and the discontinuous portion is corrected in the pixel area through the above steps (2-8) and (2-9).

The pixel area of DL2[V][H]=1 represents the area in which the edge component is larger than the predetermined value. Such the pixel area does not appear in a continuous halftone area or a dot area where the number of lines is high, but appears in the character/line image area or the edge portion of the dot area where the number of lines is low.

The pixel of DL2[V][H]=0 represents a non-edge area, while the pixel of DL2[V][H]=1 represents an edge area. Further, the isolated point of the pixel in which the density difference was discriminated as it is large in the step (2-7) is eliminated based on the isolation discrimination in the step (2-8). Therefore, a recorded dot isolated from a continuous-gradation highlight density area on a newspaper containing a small spot on its ground or an original output by the binary printer is not discriminated as it is the edge area. Further, it is possible to prevent that the isolated point is erroneously discriminated as it is the character area in later-described character discrimination.

On the above value of DL2[V][H] being the discriminating result and the value of later-described dot discrimination result, it is judged whether or not such the value represents the character area.

Subsequently, the unit to discriminate the dot area will be explained in detail.

In FIG. 5, the unit or section surrounded by a dotted line represents the block to calculate a characteristic amount for discriminating the dot area. That is, the dot area is discriminated based on the signal BDT[V][H] obtained as the result of binarizing the edge-emphasized remarkable pixel value by using the average value of the pixel values of the areas in the periphery of the remarkable pixel in the above binarizing process step (2-6). The binarized result BDT=1 or 0 in the above binarizing process depends on the dot arrangement in the dot image area, thereby forming a block of BDT=1 and a block of BDT=0 isolated from each other. On the other hand, as compared with the dot area, the continuous area of BDT=1 or 0 is formed in the character/line area. In this unit, by referring to the value of BDT, it is discriminated whether or not the objective area is the dot area, based on the result calculated by using isolation of the BDT arrangements as the character amount.

(3-1) 1×1 Isolated Amount Calculation

In this step, the calculation of the isolated amount is performed by referring to BDT of the 3×3 area containing the remarkable pixel at its central position. Concretely, in a case where the value of BDT changes in each direction, i.e., "0" in longitudinal, "1" in lateral and "0" in diagonal, the isolated amount for each direction is set to be "1", and the sum of these values is set to be the isolated amount KA1 [V][H] for the remarkable pixel. FIGS. 11A and 11B respectively show isolated amount calculation methods.

In FIG. 11A, each of characters a, b, c and d represents the isolated amount for each direction to which BDT is referred in the 3×3 area. That is, when BDT changes "0" (longitudinal), "1" (lateral) and "0" (diagonal), the isolated amount "1" is obtained.

The isolated amount KA1[V][H] for the remarkable pixel is calculated according to a following formula.

$$KA1[V][H]=a+b+c+d$$

However, in a case where the arrangement of BDT=1 is continuous for the above four directions, it is highly possible that such the case represents the fine-line area. Therefore, the isolated amount KA1[V][H] is set to be KA1[V][H]=0. This case has a feature that the isolated amount becomes relatively large when the dot (or screen dot) consists of one pixel. Namely, the isolated amount is relatively large for the low-density dot pixel or the dot in which the number of lines is high.

FIG. 11B shows an example in which the level of BDT is provided in inverse relation to the example shown in FIG. 11A. Concretely, in a case where the value of BDT changes in each direction, i.e., "1" in longitudinal, "0" in lateral and "1" in diagonal, the isolated amount for each direction is set to be "1".

In the same manner as above, the isolated amount KA0 [V][H] for the remarkable pixel is calculated according to a following formula.

$$KA0[V][H]=a+b+c+d$$

However, in a case where the arrangement of BDT=0 is continuous for the above four directions, it is highly possible that such the case represents the fine-line area. Therefore, the isolated amount KA0[V][H] is set to be KA0[V][H]=0 to calculate the isolated amount of the remarkable pixel.

(3-2) 2×2 Isolated Amount Calculation

In this step, the isolated amount for the 2×2 area is calculated.

Figure 12:
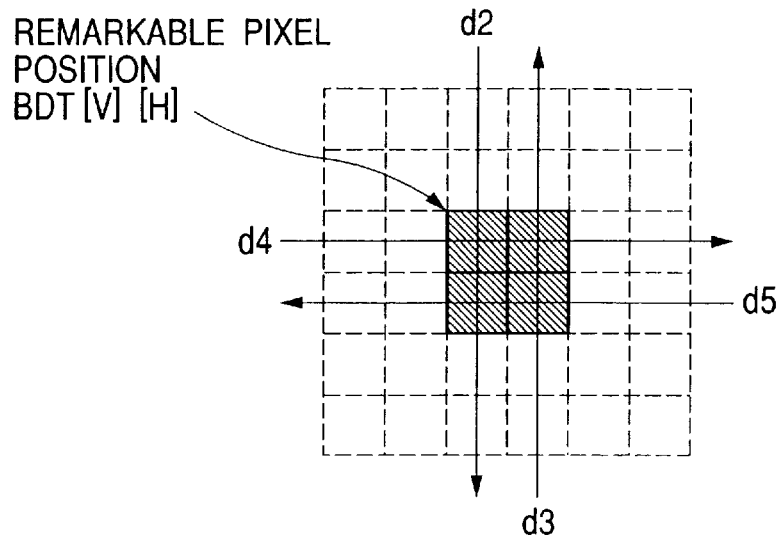
FIG. 12 is a diagram for explaining a method to calculate the isolated amount.

FIGS. 12, 13, 14, 15 and 16 respectively show the pixel areas of BDT to be referred to in case of isolated amount discrimination. In FIG. 12, the sum of the values of BDT in d2, d3, d4 and d5 directions is calculated according to following formulas.

$$d2=BDT[V][H]+BDT[V+1][H]$$

$$d3=BDT[V][H+1]+BDT[V+1][H+1]$$

$$d4=BDT[V][H]+BDT[V][H+1]$$

$$d5=BDT[V+1][H]+BDT[V+1][H+1]$$

Figure 13:
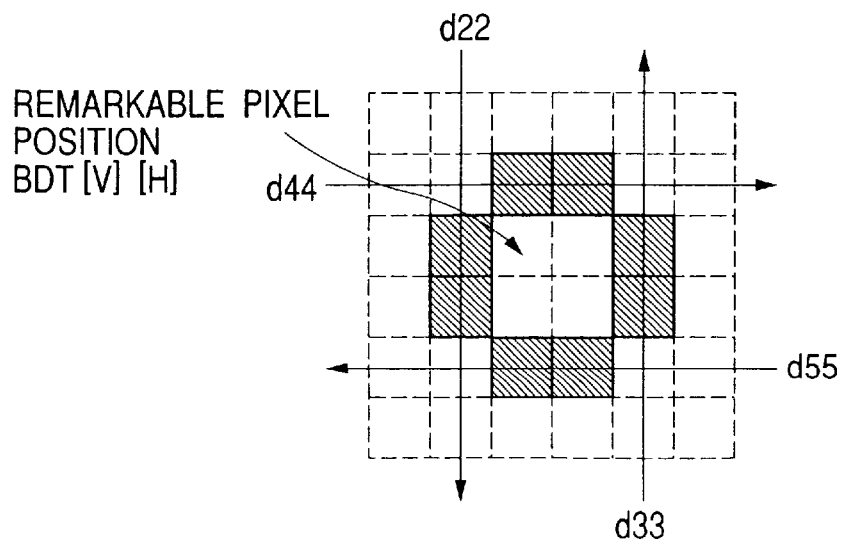
FIG. 13 is a diagram for explaining a method to calculate the isolated amount.

Similarly, in FIG. 13

$$d22=BDT[V][H-1]+BDT[V+1][H-1]$$

$$d33=BDT[V][H+2]+BDT[V+1][H+2]$$

$$d44=BDT[V-1][H]+BDT[V-1][H+1]$$

$$d55=BDT[V+2][H]+BDT[V+2][H+1]$$

Figure 14:
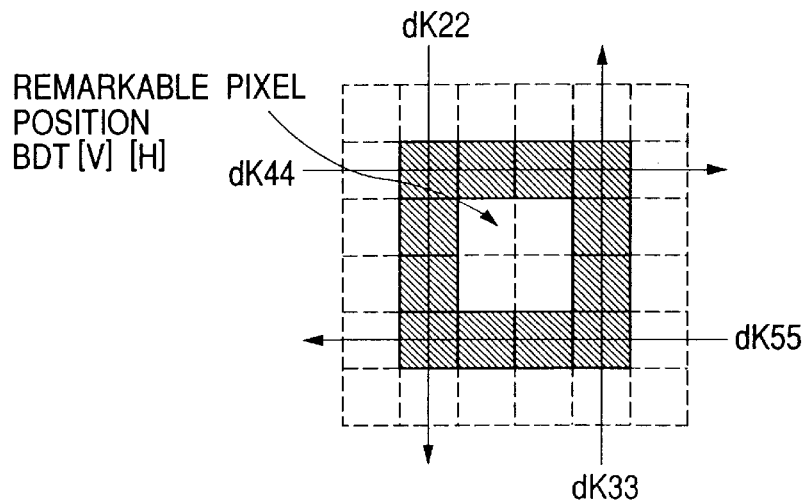
FIG. 14 is a diagram for explaining a method to calculate the isolated amount.

In FIG. 14

$$dK22=BDT[V][H-1]+BDT[V+1][H-1]+BDT[V-1][H-1]+BDT[V+2][H-1]$$

$$dK33=BDT[V][H+2]+BDT[V+1][H+2]+BDT[V-1][H+2]+BDT[V+2][H+2]$$

$$dK44=BDT[V-1][H]+BDT[V-1][H+1]+BDT[V-1][H-1]+BDT[V-1][H+2]$$

$$dK55=BDT[V+2][H]+BDT[V+2][H+1]+BDT[V+2][H-1]+BDT[V+2][H+2]$$

Figure 15:
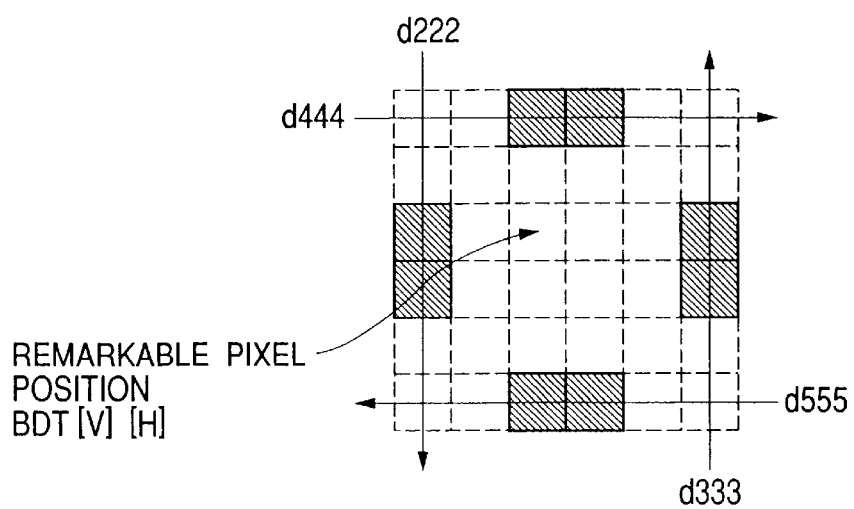
FIG. 15 is a diagram for explaining a method to calculate the isolated amount.

In FIG. 15

$$d222=BDT[V][H-2]+BDT[V+1][H-2]$$

$$d333=BDT[V][H+3]+BDT[V+1][H+3]$$

$$d444=BDT[V-2][H]+BDT[V-2][H+1]$$

$$d555=BDT[V+3][H]+BDT[V+3][H+1]$$

Figure 16:
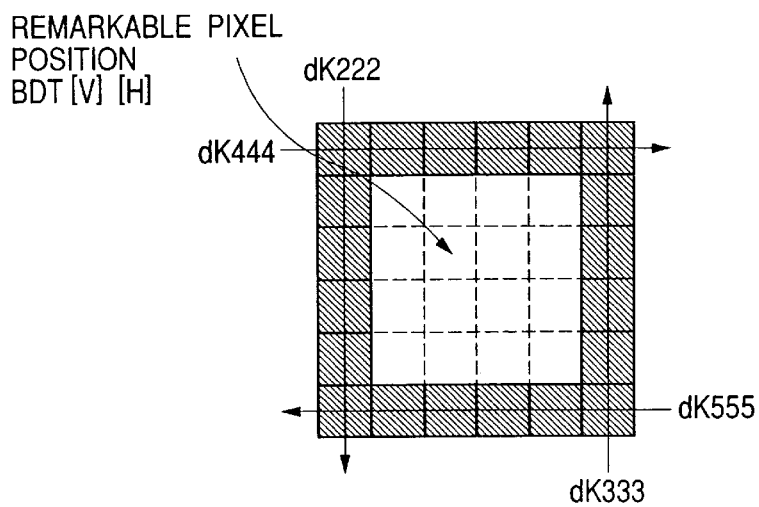
FIG. 16 is a diagram for explaining a method to calculate the isolated amount.

In FIG. 16

$$dK222=BDT[V-2][H-2]+BDT[V-1][H-2]+BDT[V][H-2]+BDT[V+1][H-2]+BDT[V+2][H-2]+BDT[V+3][H-2]$$

$$dK333=BDT[V-2][H+3]+BDT[V-1][H+3]+BDT[V][H+3]+BDT[V+1][H+3]+BDT[V+2][H+3]+BDT[V+3][H+3]$$

$$dK444=BDT[V-2][H-2]+BDT[V-2][H-1]+BDT[V-2][H]+BDT[V-2][H+1]+BDT[V-2][H+2]+BDT[V-2][H+3]$$

$$dK555=BDT[V+3][H-2]+BDT[V+3][H-1]+BDT[V+3][H]+BDT[V+3][H+1]+BDT[V+3][H+2]+BDT[V+3][H+3]$$

Further, a sum d1 of the values of BDT for the 2×2 area including the remarkable pixel is calculated according to a following formula.

$$d1=BDT[V][H]+BDT[V][H+1]+BDT[V+1][H]+BDT[V+1][H+1]$$

Here, an isolated amount KAA1[V][H] for the 2×2 area is calculated according to following formulas.

$$ddn=dn-dnn$$

$$ddnn=dn-dnnn$$

where n=2, 3, 4, 5

If {(dd2>0||dd22>0) && (dd3>0||dd33>0)}, then KRTV [V][H]=1.

In else cases, KRTV[V][H]=0.

Further, if {(dd4>0||dd44>0) && (dd5>0||dd55>0)}, then KRTH[V][H]=1.

In else cases, KRTH[V][H]=0.

Here, "||" and "&&" denote "OR" and "AND" in a logical operation, respectively.

For the central pixels of the 2×2 area shown in FIG. 12, if the number of pixels of BDT=1 decreases in case of referring to the peripheral pixels, the values of "ddn" and "ddnn" are ddn, ddnn>0. Further, if the number of pixels of BDT=1 for the sub scanning direction V decreases, KRTV [V][H]=1. On the other hand, if such the number is identical or increases, KRTV[V][H]=0.

Similarly, if the number of pixels of BDT=1 decreases for the main scanning direction H, KRTH[V][H]=1. On the other hand, if such the number is identical or increases, KRTH[V][H]=0.

Here, each of KRTV[V][H] and KRTH[V][H] represents isolation of the 2×2 area pixel of BDT=1 for corresponding each of the sub and main scanning directions. If the pixel of BDT=1 is isolated and exists for each direction, KRTV[V] [H] and KRTH[V][H] are set to be "1".

Figure 17:
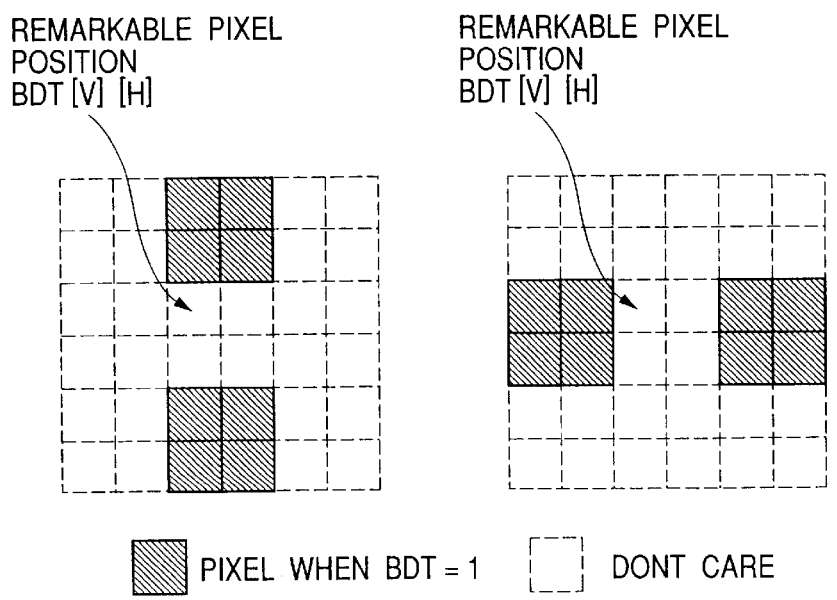
FIG. 17 is a diagram showing patterns to judge a dot area.

Further, since patterns as shown in FIG. 17 often represent the fine line portion in the character/line image area, KRTV [V][H]=KRTV[V][H]=0 is set.

Furthermore, if d1=4, then Kaa1[V][H]=KRTV[V][H]+ KRTH[V][H].

On the other hand, if d1≠4, then Kaa1[V][H]=0.

Thus, the isolated amount Kaa1[V][H] concerning BDT=1 for the remarkable pixel is calculated.

Similarly, the isolated amount Kaa0[V][H] concerning BDT=0 for the remarkable pixel is calculated.

If {(dd2<0||dd22<0) && (dd3<0||dd33<0)}, then KRTV [V][H]=1.

In else cases, KRTV[V][H]=0.

Further, if {(dd4<0||dd44<0) && (dd5<0||dd55<0)}, then KRTH[V][H]=1.

In else cases, KRTH[V][H]=0.

Here, "||" and "&&" denote "OR" and "AND" in the logical operation, respectively.

For the central pixels of the 2×2 area shown in FIG. 12, if the number of pixels of BDT=1 increases in case of referring to the peripheral pixels, the values of "ddn" and "ddnn" are ddn, ddnn<0. Further, if the number of pixels of BDT=1 for the sub scanning direction V increases, KRTV[V][H]=1. On the other hand, if such the number is identical or decreases, KRTV[V][H]=0.

Here, each of KRTV[V][H] and KRTH[V][H] represents isolation of the 2×2 area pixel of BDT=0 for corresponding each of the sub and main scanning directions. If the pixel of BDT=0 is isolated and exists for each direction, KRTV[V][H] and KRTH[V][H] are set to be "1".

Further, since patterns as shown in FIG. 18 often represent the fine line portion in a white blank character/line image area, KRTV[V][H]=KRTH[V][H]=0 is set.

Furthermore, if d1=0, then Kaa0[V][H]=KRTV[V][H]+KRTH[V][H].

On the other hand, if d1≠0, then Kaa0[V][H]=0.

Thus, the isolated amount Kaa0[v][H] concerning BDT=0 for the remarkable pixel is calculated.

In this case, although the structure to refer to the pixels apart up to two pixels in both the main and sub scanning directions as the area to be referred to when the isolated amount for the 2×2 area is applied, the area to be referred to is not limited to this. However, for the dot image read at 600 dpi, the isolated amount of the dot or screen dot can be successfully detected by referring to the area shown in the present embodiment.

Subsequently, methods to calculate the isolated amounts KAP1[V][H] and KAP0[V][H] for the dot of the 2×2 area will be described.

In the methods, KAP1[V][H] and KAP0[V][H] are calculated according to following calculation conditions.

Initially, $$ddn = dn - dKnn$$

$$ddnn = dn - dKnnn$$

where n=2, 3, 4, 5

Since dKnn is used in the right term of the above formula, it prevents that the values of ddn and ddnn become positive in diagonal continuous fine lines frequently appearing in the character area, and thus the isolated amount is added according to following conditions.

$$d1=4 \quad \text{(condition 1)}$$

$$(dd2>0 \| dd22>0) \,\&\&\, (dd3>0 \| dd33>0) \,\&\&\, (dd4>0 \| dd44>0) \,\&\&\, (dd5>0 \| dd55>0) \quad \text{(condition 2)}$$

When the above conditions 1 and 2 are both satisfied, $$KAP1[V][H] += BDT[V][H], KAP1[V][H+1] += BDT[V][H+1],$$

and $$KAP1[V+1][H] += BDT[V+1][H], KAP1[V+1][H+1] += BDT[V+1][H+1].$$

However, it is assumed that "0" has been previously set as an initial value of KAP1[V][H].

The isolated amount KAP1[V][H] to be calculated represents the isolated amount concerning the pixel of BDT=1 in the 2×2 area. When the pixels of BDT=1 for both the main and sub scanning directions decrease, the pixel of BDT=1 in the 2×2 area is added with the isolated amount "1". In this case, the isolated amount KAP1 is added only to the pixel of BDT=1, the similar effect can be derived even if "1" is added irrespective of the value of BDT.

Similarly, the isolated amount for the pixel BDT=0 is calculated according to following conditions.

$$ddn = dn - dnn$$

$$ddnn = dn - dnnn$$

where n=2, 3, 4, 5

$$d1=0 \quad \text{(condition 1)}$$

$$(dd2<0 \| dd22<0) \,\&\&\, (dd3<0 \| dd33<0) \,\&\&\, (dd4<0 \| dd44<0) \,\&\&\, (dd5<0 \| dd55<0) \quad \text{(condition 2)}$$

When the above conditions 1 and 2 are both satisfied, $$KAP0[V][H] += (\text{not } BDT[V][H]), KAP0[V][H+1] += (\text{not } BDT[V][H+1]),$$

and $$KAP0[V+1][H] += (\text{not } BDT[V+1][H]), KAP0[V+1][H+1] += (\text{not } BDT[V+1][H+1]).$$

It is assumed in this case that "0" has been previously set as an initial value of KA0[V][H].

If a pattern of FIG. 19 seemed to appear in the character area is added with a following condition such that the isolated amount is not added, the difference between the isolated amount in the character area and the isolated amount in the dot area can be made further larger. Such the condition is described hereinafter.

Initially, m1 and m2 are calculated according to following formulas.

When (d22==2)∥(d222==2), m1+1; when (d33==2)∥(d333==2), m1+=1; when (d44==2)∥(d444==2), m2+1; and when (d55==2)∥(d555==2), m2+=1;

where initial values of m1 and m2 are "0", and m1, m2=0 to 2.

$$(m1>1 \| m2>1) \quad \text{(condition 3)}$$

When the above conditions 1, 2 and 3 are all satisfied, $$KAP0[V][H] += (\text{not } BDT[V][H]), KAP0[V][H+1] += (\text{not } BDT[V][H+1]), KAP0[V+1][H] += (\text{not } BDT[V+1][H]), KAP0[V+1][H+1] += (\text{not } BDT[V+1][H+1])$$

The pattern shown in FIG. 19 represents a shape such as <<☐>> in the character area. This pattern frequently appears as the character, and also appears in the high-density dot area. By adding the condition 2, the effect not to increase the isolated amount in the character area can be derived. Similarly, in the high-density dot image area, the isolated amount does not increase. By adding the above condition 2, the present embodiment applies the structure not to increase the isolated amount in the character portion, thereby preventing that the character portion is erroneously discriminated as the dot area. Although the present embodiment shows the example in which the discrimination attaching importance to the character area is performed, the above condition 3 may not be used in case of attaching importance to the detection in the dot area.

(3-3) 3×3 Isolated Amount Calculation

In this step, the isolated amount for the 3×3 area is calculated.

FIGS. 20, 21, 22, 23 and 24 respectively show the pixel areas of BDT to be referred to in case of isolated amount discrimination.

Figure 20:
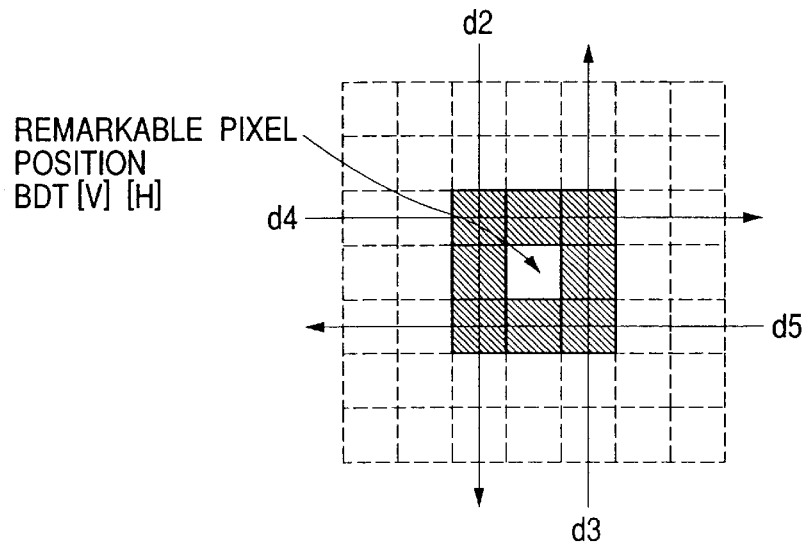
FIG. 20 is a diagram for explaining a method to calculate the isolated amount.

In FIG. 20, the sum of the values of BDT in d2, d3, d4 and d5 directions is calculated according to following formulas.

$$d2 = BDT[V-1][H-1] + BDT[V][H-1] + BDT[V+1][H-1]$$

$$d3 = BDT[V-1][H+1] + BDT[V][H+1] + BDT[V+1][H+1]$$

$d4=BDT[V-1][H-1]+BDT[V-1][H]+BDT[V-1][H+1]$ $d5=BDT[V+1][H-1]+BDT[V+1][H]+BDT[V+1][H+1]$

Figure 21:
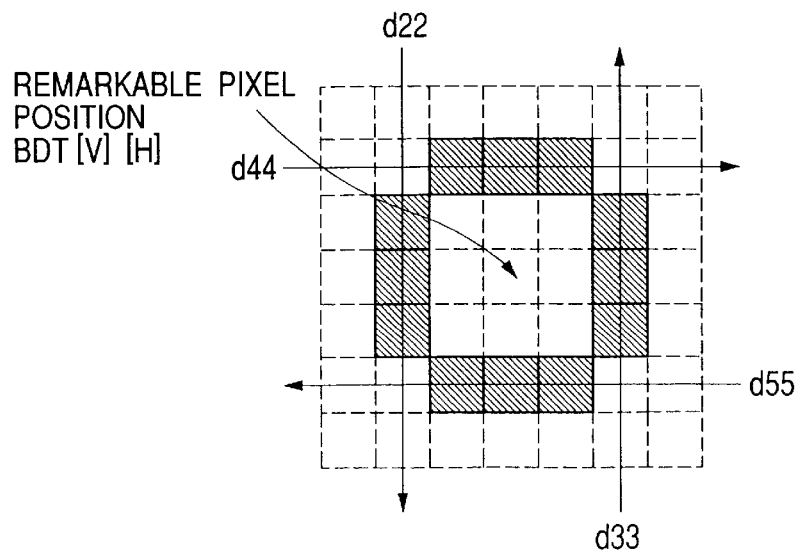
FIG. 21 is a diagram for explaining a method to calculate the isolated amount.

Similarly, in FIG. 21

$d22=BDT[V-1][H-2]+BDT[V][H-2]+BDT[V+1][H-2]$ $d33=BDT[V-1][H+2]+BDT[V][H+2]+BDT[V+1][H+2]$ $d44=BDT[V-2][H-1]+BDT[V-2][H]+BDT[V-2][H+1]$ $d55=BDT[V+2][H-1]+BDT[V+2][H]+BDT[V+2][H+1]$

Figure 22:
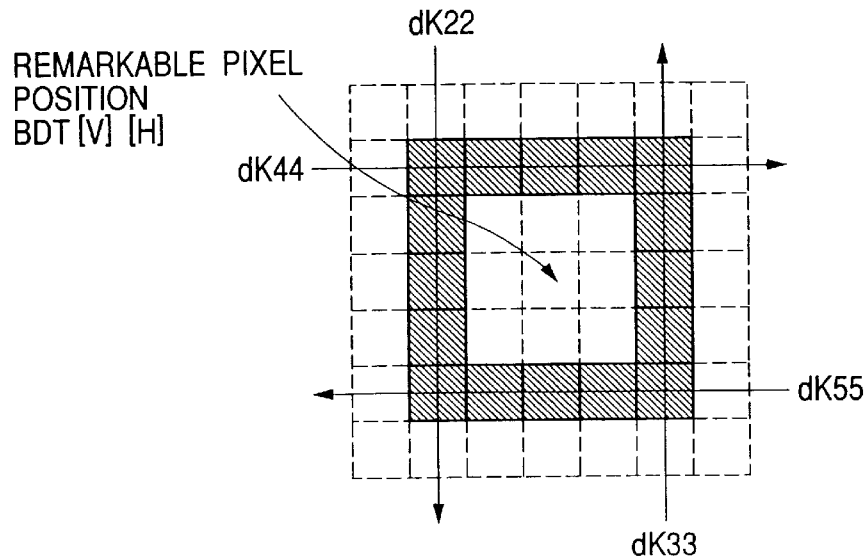
FIG. 22 is a diagram for explaining a method to calculate the isolated amount.

In FIG. 22

$dK22=BDT[V-2][H-2]+BDT[V-1][H-2]+BDT[V][H-2]+BDT[V+1][H-2]+BDT[V+2][H-2]$ $dK33=BDT[V-2][H+2]+BDT[V-1][H+2]+BDT[V][H+2]+BDT[V+1][H+2]+BDT[V+2][H+2]$ $dK44=BDT[V-2][H-2]+BDT[V-2][H-1]+BDT[V-2][H]+BDT[V-2][H-1]+BDT[V-2][H+2]$ $dK55=BDT[V+2][H-2]+BDT[V+2][H-+]+BDT[V+2][H]+BDT[V+2][H+1]+BDT[V+2][H+2]$

Figure 23:
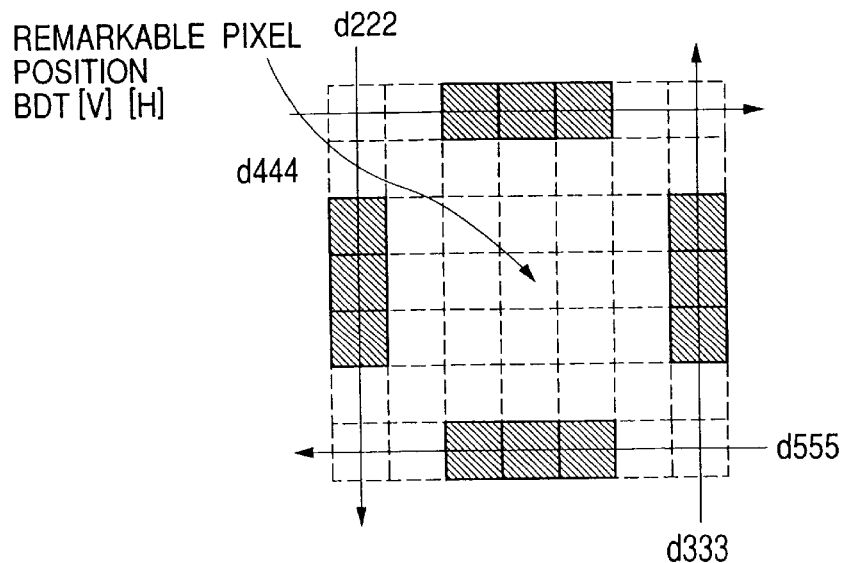
FIG. 23 is a diagram for explaining a method to calculate the isolated amount.

In FIG. 23

$d222=BDT[V-1][H-3]+BDT[V][H-3]+BDT[V+1][H-3]$ $d333=BDT[V-1][H+3]+BDT[V-1][H+3]+BDT[V-1][H+3]$ $d444=BDT[V-3][H-1]+BDT[V-3][H]+BDT[V-3][H+1]$ $d555=BDT[V+3][H-1]+BDT[V+3][H]+BDT[V+3][H+1]$

Figure 24:
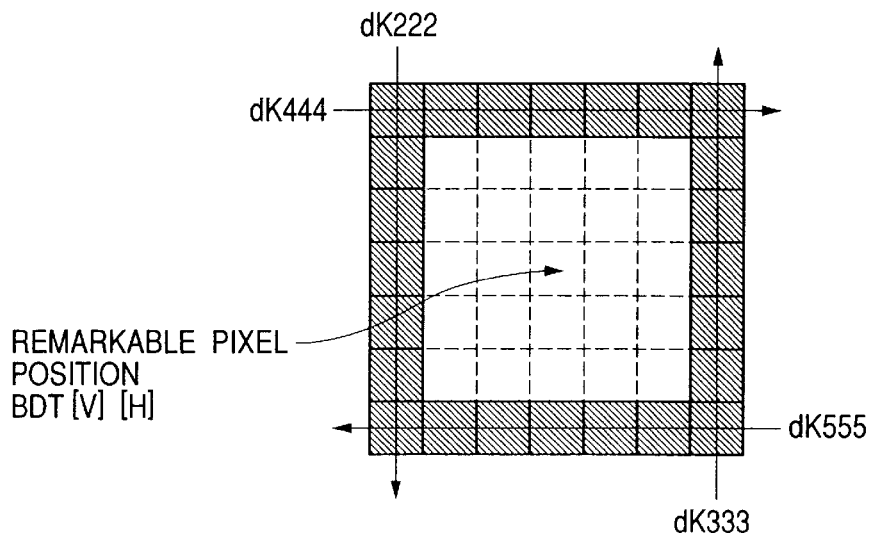
FIG. 24 is a diagram for explaining a method to calculate the isolated amount.

In FIG. 24

$dK222=BDT[V-3][H-3]+BDT[V-2][H-3]+BDT[V-1][H-3]+BDT[V][H-3]+BDT[V+1][H-3]+BDT[V+2][H-3]+BDT[V+3][H-3]$ $dK333=BDT[V-3][H+3]+BDT[V-2][H+3]+BDT[V-1][H+3]+BDT[V][H+3]+BDT[V+1][H+3]+BDT[V+2][H+3]+BDT[V+3][H+3]$ $dK444=BDT[V-3][H-3]+BDT[V-3][H-2]+BDT[V-3][H-1]+BDT[V-3][H]+BDT[V-3][H+1]+BDT[V-3][H+2]+BDT[V-3][H+3]$ $dK555=BDT[V+3][H-3]+BDT[V+3][H-2]+BDT[V+3][H-1]+BDT[V+3][H]+BDT[V+3][H+1]+BDT[V+3][H+2]+BDT[V+3][H+3]$

Further, a sum d1 of the values of BDT for the 3×3 area including the remarkable pixel is calculated according to a following formula.

$d1=BDT[V-1][H-1]+BDT[V-1][H]+BDT[V-1][H+1]+BDT[V+1][H-1]+BDT[V+1][H]+BDT[V+1][H+1]+BDT[V+2][H-1]+BDT[V+2][H]+BDT[V+2][H+1]$

Like the 2×2 area, isolated amounts KAAP1[V][H] and KAAP0[V][H] for the dot or screen dot of the 3×3 area are calculated according to following formulas.

$KAAP1[V][H]$ for $BDT=1$ $ddn=dn-dKnn$ $ddnn=dn-dKnn$ where n=2, 3, 4, 5
According to following conditions, $BDT[V][H]=1$ && $d1 \geq N$ (condition 1)

where N=5

$(dd2>0\|dd22>0)$ && $(dd3>0\|dd33>0)$ && $(dd4>0\|dd44>0)$ && $(dd5>0\|dd55>0)$ (condition 2)

When the above conditions 1 and 2 are satisfied, $KAAP1[V-1][H-1]$ $+=BDT[V-1][H-1],$ $KAAP1[V-1][H]+=BDT[V-1]$ $[H], KAAP1[V-1][H+1]$ $+=BDT[V-1][H+1], KAAP$ $1[V][H-1]+=BDT[V][H-1],$ $KAAP1[V][H]+=BDT[V][H], KAAP$ $1[V][H+1]+=BDT[V][H+1],$ $KAAP1[V+1][H]+=BDT[V+1]$ $[H-1], KAAP1[V+1][H]$ $+=BDT[V+1][H],$ and $KAAP1[V+1][H+1]+=BDT[V+1][H+1];$ where an initial value of KAAP1[V][H] is "0".

The condition 1 represents a condition to discriminate the number of pixels of BDT=1 in the 3×3 area including the remarkable pixel position, i.e., N=5 in the present embodiment. However, the such the number is not limited to this, but may be changed according to the resolution and the MTF characteristic of the input image.

$KAAP0[V][H]$ for $BDT=0$ $ddn=dn-dnn$ $ddnn=dn-dnnn$ where n=2, 3, 4, 5
When $(d22==3)\|(d222==3)$, m1++; when $(d33==3)\|(d333==3)$, m1++; when $(d44==3)\|(d444==3)$, m2++; and $(d55==3)\|(d555==3)$, m2++;
where initial values of m1 and m2 are "0".

$BDT[V][H]=0$ && $d1=\leq 0$ (condition 1)

$(dd2<0\|dd22<0)$ && $(dd3<0\|dd33<0)$ && $(dd4<0\|dd44<0)$ && $(dd5<0\|dd55<0)$ (condition 2)

$(m1>1\|m2>1)$ (condition 3)

When the above conditions 1, 2 and 3 are all satisfied, $KAAP0[V-1][H-1]$ $+=(not\ BDT[V-1][H-1]),$ $KAAP0[V-1][H]$ $+=(not\ BDT[V-1][H]),$ $KAAP0[V-1][H+1]$ $+=(not\ BDT[V-1][H+1]),$ $KAAP0[V][H-1]+=(not\ BDT[V]$ $[H-1]), KAAP0[V][H]$ $+=(not\ BDT[V][H]), KAAP$ $0[V][H+1]+=$(not $BDT[V]$ $[H+1]$), $KAAP0[V+1][H]$ $+=$(not $BDT[V+1][H-1]$), $KAAP0[V+1][H]+=$(not $BDT[V+1]$ $[H]$), and $KAAP0[V+1][H+1]$ $+=$(not $BDT[V+1][H+1]$);

where an initial value of KAAP0[V][H] is "0".

(3-4) 4×4 Isolated Amount Calculation

In this step, the isolated amounts KAAP1[V][H] and KAAAP0[V][H] for the 4×4 area are calculated in the same manner as in the step (3-3).

Figure 25:
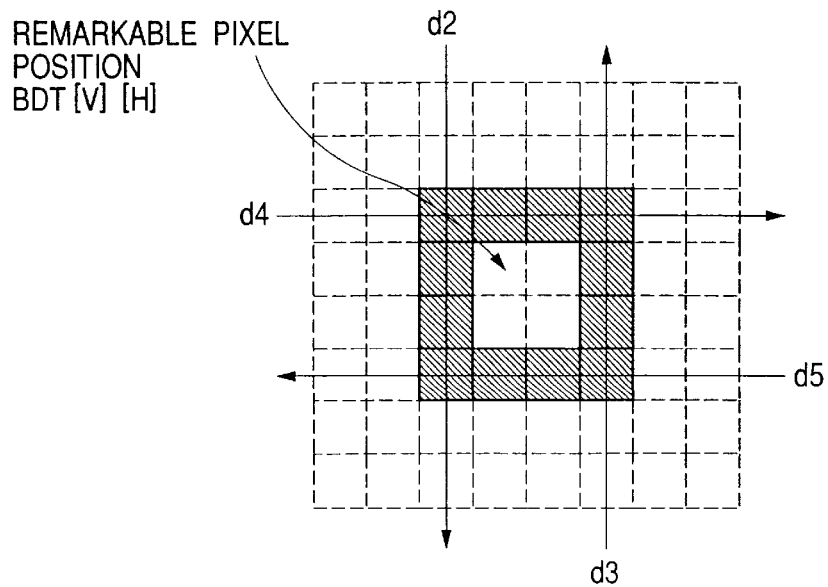
FIG. 25 is a diagram for explaining a method to calculate the isolated amount.

In FIG. 25, the sum of the values of BDT in d2, d3, d4 and d5 directions is calculated according to following formulas.

$d2=BDT[V-1][H-1]+BDT[V][H-1]+BDT[V+1][H-1]+BDT[V+2][H-1]$ $d3=BDT[V-1][H+2]+BDT[V][H+2]+BDT[V+1][H+2]+BDT[V+2][H+2]$ $d4=BDT[V-1][H-1]+BDT[V-1][H]+BDT[V-1][H+1]+BDT[V-1][H+2]$ $d5=BDT[V+2][H-1]+BDT[V+2][H]+BDT[V+2][H+1]+BDT[V+2][H+2]$

Figure 26:
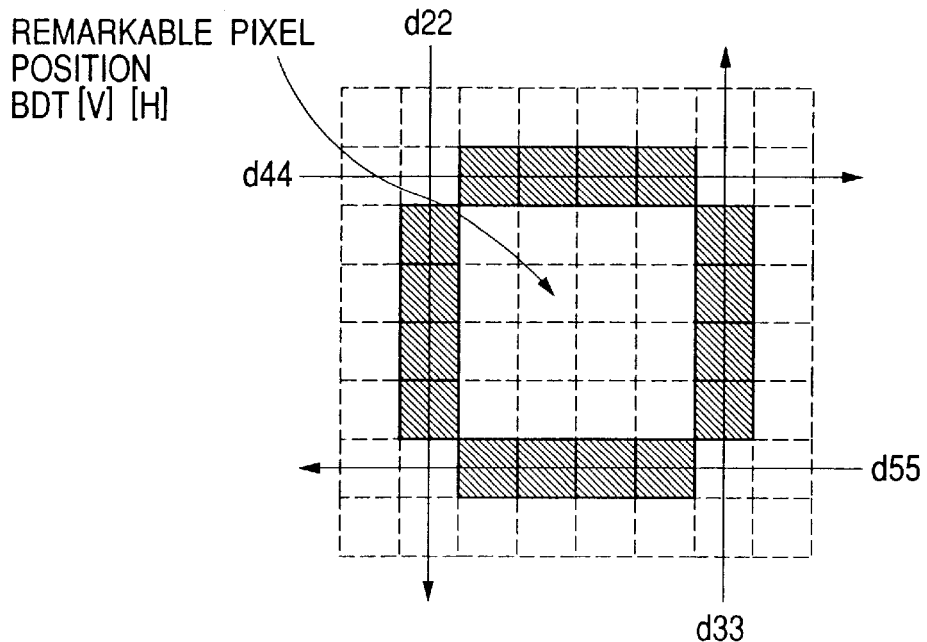
FIG. 26 is a diagram for explaining a method to calculate the isolated amount.

Similarly, in FIG. 26

$d22=BDT[V-1][H-2]+BDT[V][H-2]+BDT[V+1][H-2]+BDT[V+2][H-2]$ $d33=BDT[V-1][H+3]+BDT[V][H+3]+BDT[V+1][H+3]+BDT[V+2][H+3]$ $d44=BDT[V-2][H-1]+BDT[V-2][H]+BDT[V-2][H+1]+BDT[V-2][H+2]$ $d55=BDT[V+3][H-1]+BDT[V+3][H]+BDT[V+3][H+1]+BDT[V+3][H+2]$

Figure 27:
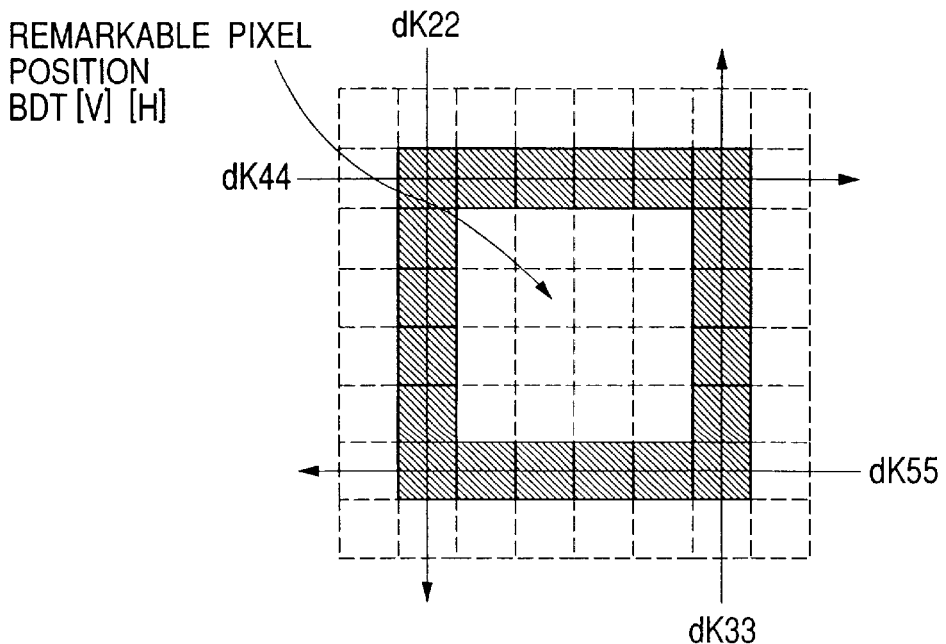
FIG. 27 is a diagram for explaining a method to calculate the isolated amount.

In FIG. 27

$dK22=BDT[V-2][H-2]+BDT[V-1][H-2]+BDT[V][H-2]+BDT[V+1][H-2]+BDT[V+2][H-2]+BDT[V+3][H-2]$ $dK33=BDT[V-2][H+3]+BDT[V-1][H+3]+BDT[V][H+3]+BDT[V+1][H+3]+BDT[V+2][H+3]+BDT[V+3][H+3]$ $dK44=BDT[V-2][H-2]+BDT[V-2][H-1]+BDT[V-2][H]+BDT[V-2][H+1]+BDT[V-2][H+2]+BDT[V-2][H+3]$ $dK55=BDT[V+3][H-2]+BDT[V+3][H-1]+BDT[V+3][H]+BDT[V+3][H+1]+BDT[V+3][H+2]+BDT[V+3][H+3]$

Figure 28:
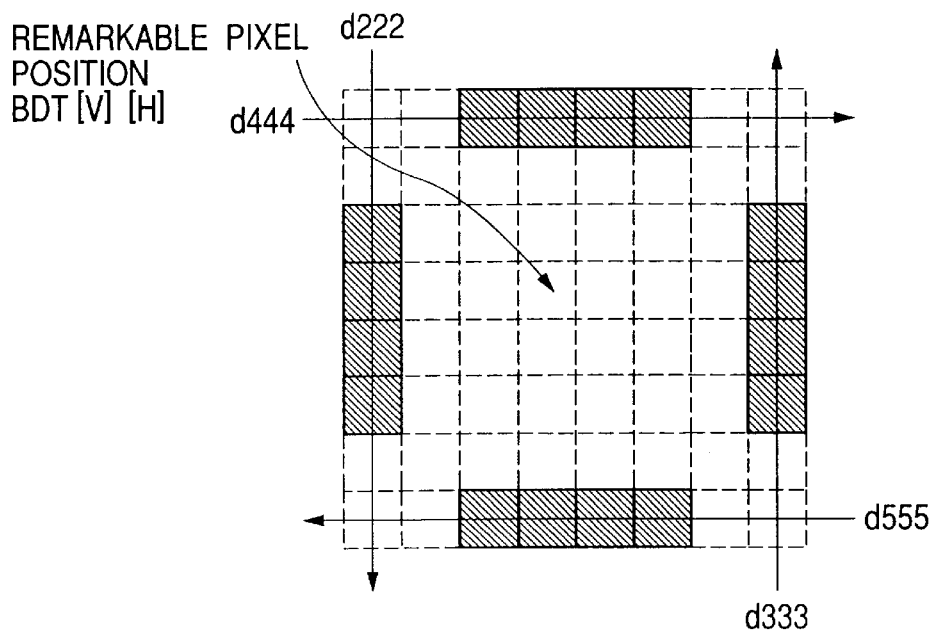
FIG. 28 is a diagram for explaining a method to calculate the isolated amount.

In FIG. 28

$d222=BDT[V-1][H-3]+BDT[V][H-3]+BDT[V+1][H-3]+BDT[V+2][H-3]$ $d333=BDT[V-1][H+4]+BDT[V][H+4]+BDT[V+1][H+4]+BDT[V-2][V+4]$ $d444=BDT[V-3][H-1]+BDT[V-3][H]+BDT[V-3][H+1]+BDT[V-3][H+2]$ $d555=BDT[V+4][H-1]+BDT[V+4][H]+BDT[V+4][H+1]+BDT[V+4][H+2]$

Figure 29:
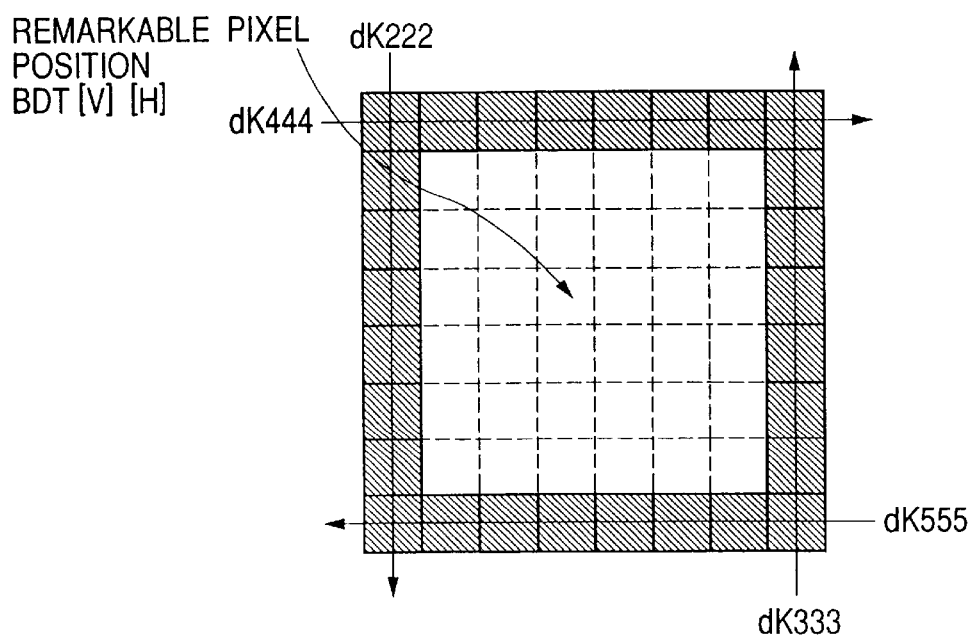
FIG. 29 is a diagram for explaining a method to calculate the isolated amount.

In FIG. 29

$dK222=BDT[V-3][H-3]+BDT[V-2][H-3]+BDT[V-1][H-3]+BDT[V][H-3]+BDT[V+1][H-3]+BDT[V+2][H-3]+BDT[V+3][H-3]+BDT[V+4][H-3]$ $dK333=BDT[V-3][H+4]+BDT[V-2][H+4]+BDT[V-1][H+4]+BDT[V][H+4]+BDT[V+1][H+4]+BDT[V+2][H+4]+BDT[V+3][H+4]+BDT[V+4][H+4]$ $dK444=BDT[V-3][H-3]+BDT[V-3][H-2]+BDT[V-3][H-1]+BDT[V-3][H]+BDT[V-3][H+1]+BDT[V-3][H+2]+BDT[V-3][H+3]+BDT[V-3][H+4]$ $dK555=BDT[V+4][H-3]+BDT[V+4][H-2]+BDT[V+4][H-1]+BDT[V+4][H]+BDT[V+4][H+1]+BDT[V+4][H+2]+BDT[V+4][H+3]+BDT[V+4][H+4]$

Further, a sum d1 of the values of BDT for the 4×4 area including the remarkable pixel is calculated according to a following formula.

$d1=BDT[V-1][H-1]$ $+BDT[V-1][H]+BDT[V-1]$ $[H+1]+BDT[V-1][H+2]$ $+BDT[V][H-1]+BDT[V][H]$ $+BDT[V][H+1]+BDT[V]$ $[H+2]+BDT[V+1][H-1]$ $+BDT[V+1][H]+BDT[V+1]$ $[H+1]+BDT[V+1][H+2]$ $+BDT[V+2][H-1]+BDT[V+2]$ $[H]+BDT[V+2][H+1]$ $+BDT[V+2][H+2]$

Like the 2×2 area, isolated amounts KAAAP1[V][H] and KAAAP0[V][H] for the dot or screen dot of the 4×4 area are calculated according to following formulas.

$KAAAP1[V][H]$ for $BDT=1$ $ddn=dn-dKnn$ $ddnn=dn-dKnnn$ where n=2, 3, 4, 5

$(BDT[V][H]=1$ && $BDT[V+1][H]=1$ && $BDT[V][H+1]=1$ && $BDT[V+1][H+1]=1)$ && $d1 \geq 9$ (condition 1)

$(dd2>0 \| dd22>0)$ && $(dd3>0 \| dd33>0)$ && $(dd4>0 \| dd44>0)$ && $(dd5>0 \| dd55>0)$ (condition 2)

When the above conditions 1 and 2 are both satisfied, $KAAAP1[V-1][H-1]$ $+=BDT[V-1][H-1]$, $KAAAP1[V-1][H]$ $+=BDT[V-1][H]$, $KAAAP$ $1[V-1][H+1]$ $+=BDT[V-1][H+1]$, $KAAAP1[V-1][H+2]$ $+=BDT[V-1][H+2]$, $KAAAP1[V][H-1]+=BDT[V]$ $[H-1]$, $KAAAP1[V][H]$

+=BDT[V][H], KAAAP1[V][H+1]

+=BDT[V][H+1], KAAAP1[V]

[H+2]+=BDT[V][H+2],

KAAAP1[V+1][H]+=BDT[V+1]

[H−1], KAAAP1[V+1][H]

+=BDT[V+1][H], KAAAP1[V+1]

[H+1]+=BDT[V+1][H+1],

KAAAP1[V+1][H+2]

+=BDT[V+1][H+2], KAAAP

1[V+2][H]+=BDT[V+2]

[H−1], KAAAP1[V+2][H]

+=BDT[V+2][H],

KAAAP1[V+2][H+1]

+=BDT[V+2][H+1],

KAAAP1[V+2][H+2]

+=BDT[V+2][H+2];

where an initial value of KAAAP1[V][H] is "0".

KAAP0[V][H] for BDT=0 ddn=dn−dnn ddnn=dn−dnnn where n=2, 3, 4, 5

When (d22==4)||(d222==4), m1++; when (d33==4)||(d333==4), m1++; when (d44==4)||(d444==4), m2++; and when (d55==4)||(d555==4), m2++,
where initial values of m1 and m2 are "0".

(BDT[V][H]=0 && BDT[V+1][H]=0 && BDT[V][H+1]0 && BDT[V+1][H+1]=0) && d1≤N    (condition 1)

(dd2<−1||dd22<−1) && (dd3<−1||dd33<−1) && (dd4<−1||dd44<−1) && (dd5<−1||dd55<−1)    (condition 2)

(m1>1||m2>1)    (condition 3)

When the above conditions 1, 2 and 3 are all satisfied,

KAAP0[V−1][H−1]

+=(not BDT[V−1][H−1]), KAAP0[V−1][H]

+=(not BDT[V−1][H]),

KAAP0[V−1][H+1]

+=(not BDT[V−1][H+1]),

KAAP0[V][H−1]+=(not BDT[V]

[H−1]), KAAP0[V][H]

+=(not BDT[V][H]),

KAAP0[V][H+1]+=(not BDT[V]

[H+1]), KAAP0[V+1][H]

+=(not BDT[V+1][H−1]),

KAAP0[V+1][H]

+=(not BDT[V+1][H]), and

KAAP0[V+1][H+1]

+=(not BDT[V+1][H+1]), where an initial value of KAAP0[V][H] is "0".

(3-5-1) 1×1 Isolated Amount Addition

In this step, the isolated amounts KA1[V][H] and KA0[V][H] for each pixel output in the 1×1 isolated amount calculation step (3-1) are added to the predetermined area. In the present embodiment, a 13×13 area including the remarkable pixel at its central position is used as the area to which each isolated amount is added. However, the present invention is not limited to this.

The result obtained by adding the 1×1 isolated amount is calculated according to following formulas.

$$SUM11[V][H] = \sum_{x=-6}^{6} \sum_{y=-7}^{7} KA1[V+x][H+y]$$

$$SUM10[V][H] = \sum_{x=-6}^{6} \sum_{y=-7}^{7} KA0[V+x][H+y]$$

(3-5-2) 2×2 Isolated Amount Addition

In the same manner as above, the isolated amounts Kaa1[V][H], Kaa0[V][H], KAP1[V][H] and KAP0[V][H] for each pixel output in the 2×2 isolated amount calculation step (3-2) are added to the predetermined area according to following formulas.

$$SUM21[V][H] = \sum_{x=-6}^{6} \sum_{y=-6}^{6} KAA1[V+x][H+y]$$

$$SUM20[V][H] = \sum_{x=-6}^{6} \sum_{y=-6}^{6} KAA0[V+x][H+y]$$

$$SUM221[V][H] = \sum_{x=-6}^{6} \sum_{y=-6}^{6} KAP1[V+x][H+y]$$

$$SUM220[V][H] = \sum_{x=-6}^{6} \sum_{y=-6}^{6} KAP0[V+x][H+y]$$

(3-5-3) 3×3 Isolated Amount Addition

In the same manner as above, the isolated amounts KAAP1[V][H] and KAAP0[V][H] for each pixel output in the 3×3 isolated amount calculation step (3-3) are added to the predetermined area according to following formulas.

$$SUM331[V][H] = \sum_{x=-5}^{5} \sum_{y=-6}^{6} KAAP1[V+x][H+y]$$

$$SUM330[V][H] = \sum_{x=-5}^{5} \sum_{y=-6}^{6} KAAP0[V+x][H+y]$$

(3-5-4) 4×4 Isolated Amount Addition

In the same manner as above, the isolated amounts KAAAP1[V][H] and KAAAP0[V][H] for each pixel output in the 4×4 isolated amount calculation step (3-4) are added to the predetermined area according to following formulas.

$$SUM441[V][H] = \sum_{x=-5}^{4} \sum_{y=-6}^{6} KAAAP1[V+x][H+y]$$

$$SUM440[V][H] = \sum_{x=-5}^{4} \sum_{y=-5}^{5} KAAAP0[V+x][H+y]$$

(4) Dot Discrimination

In this step, the results obtained by adding the isolated amounts in the 1×1, 2×2, 3×3 and 4×4 areas for the BDT data calculated in the above steps (3-5-1), (3-5-2), (3-5-3) and (3-5-4) are compared with predetermined values, to output a discriminated result PMJ[V][H] as to whether or not the remarkable pixel is within the dot area.

Discriminating conditions are shown as follows.

(SUM11[V][H]<K11) && (SUM10[V][H]<K10)   (condition 1)

(SUM21[V][H]<K21) && (SUM20[V][H]<K20)   (condition 2)

(SUM221[V][H]<K221) && (SUM220[V][H]<K220) &&
{(SUM221[V][H]+SUM220[V][H])<K22}   (condition 3)

(SUM331[V][H]<K331) && (SUM330[V][H]<K330) &&
{(SUM331[V][H]+SUM330[V][H])<K33}   (condition 4)

(SUM441[V][H]<K441) && (SUM440[V][H]<K440) &&
{(SUM441[V][H]+SUM440[V][H])<K44}   (condition 5)

When the above conditions 1, 2, 3, 4 and 5 are all satisfied,

PMJ[V][H]=1 (other than dot portion).

When any one of the above conditions 1, 2, 3, 4 and 5 is not satisfied,

PMJ[V][H]=0 (dot portion), where K11, K10, K21, K20, K221, K220, K22, K331, K330, K33, K441, K440 and K44 are predetermined constants. If K11=46, K10=40, K21=22, K20=30, K22=38, K31=54, K30=64, K33=80, K41=40, K40=50 and K44=70 are set for the input signals in the present embodiment read at the reading resolution 600 dpi, it is possible to successfully discriminate the dot image from 100 lines to 200 lines or so.

(5) Character Discrimination

In the character discrimination step (5), the character portion is extracted from the discriminating result PMJ in the dot discrimination step (4) and the processing result DL2 in the delta correction step (2-9). The discrimination at this time is performed as follows.

If MPJ[V][H]=1 and DL2[V][H]=1, then KBDET[V][H]=1 (character portion).

In other cases, KBDET[V][H]=0 (image portion).

(6) Notch Correction/Thickening Process

In the notch correction/thickening process (6), the discriminating signal KBDET generated in the character discrimination step (5) is input and corrected in the 3×3 area process, and then an obtained signal MJIDET is output. The correction process at this time is performed according to the setting of a register FTRENB in a following manner.

Figure 30:
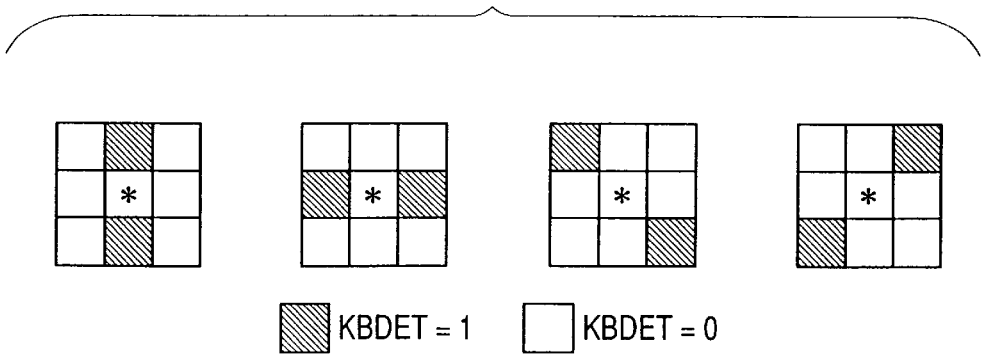
FIG. 30 is a diagram for explaining notch correction.
Figure 31:
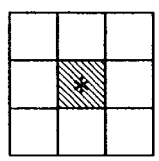
FIG. 31 is a diagram for explaining the notch correction.
Figure 33:
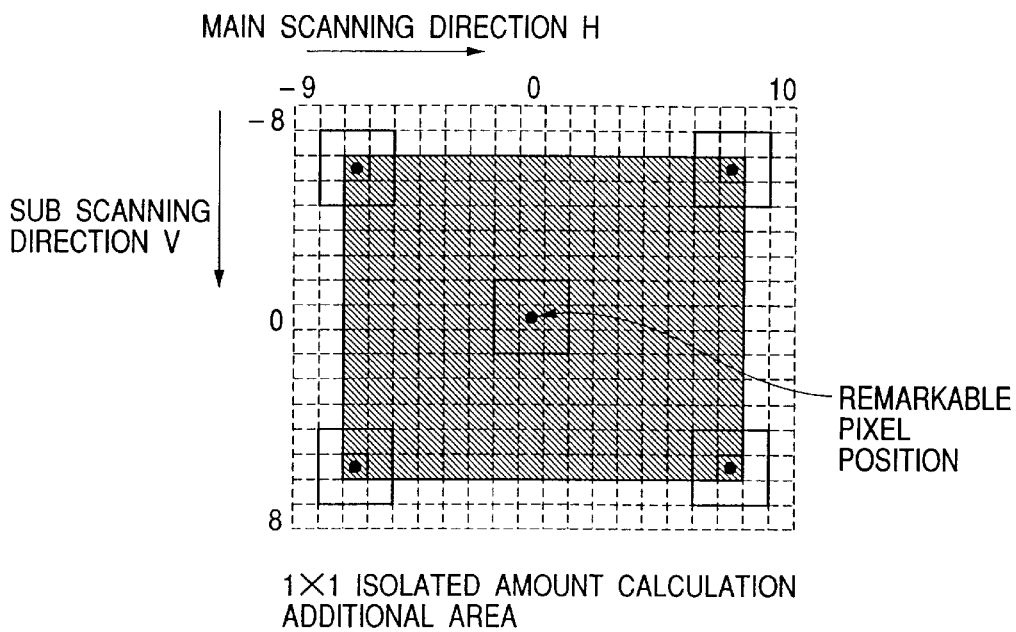
FIG. 33 is a diagram showing an isolated amount calculation additional area.
Figure 34:
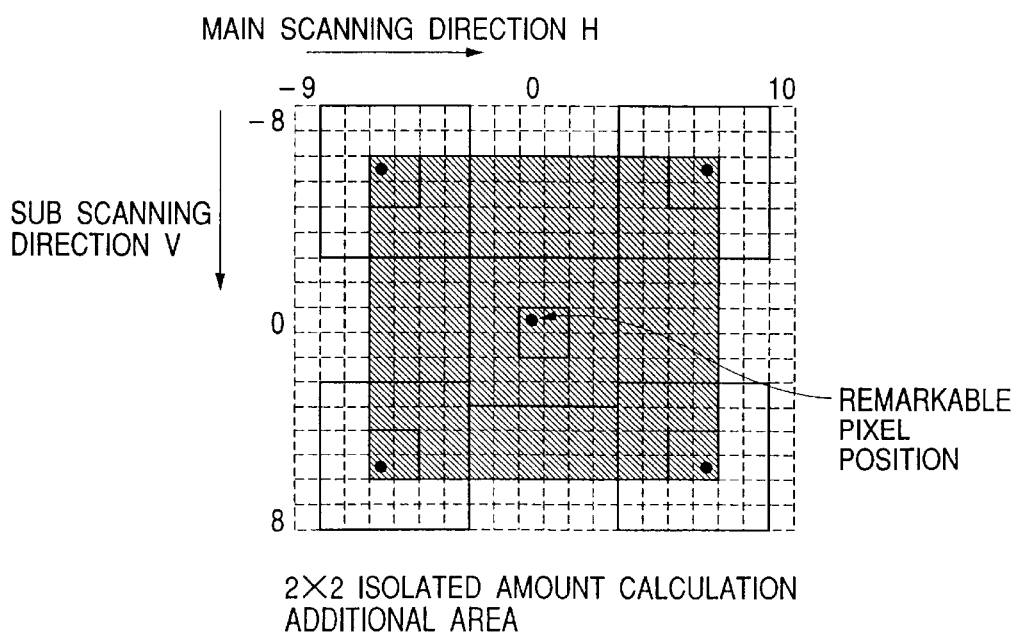
FIG. 34 is a diagram showing an isolated amount calculation additional area.
Figure 35:
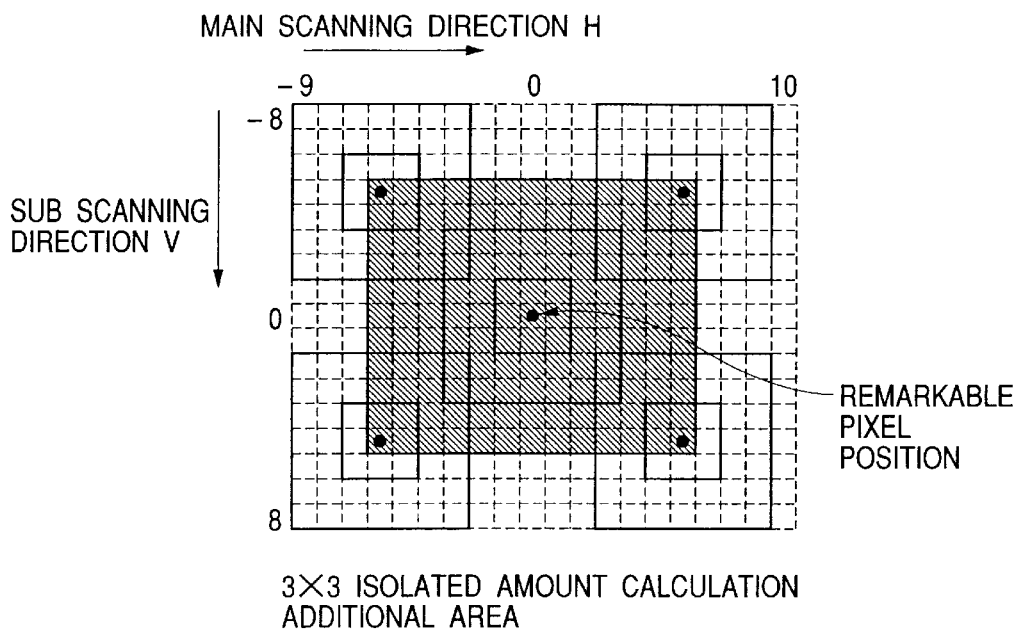
FIG. 35 is a diagram showing an isolated amount calculation additional area.
Figure 36:
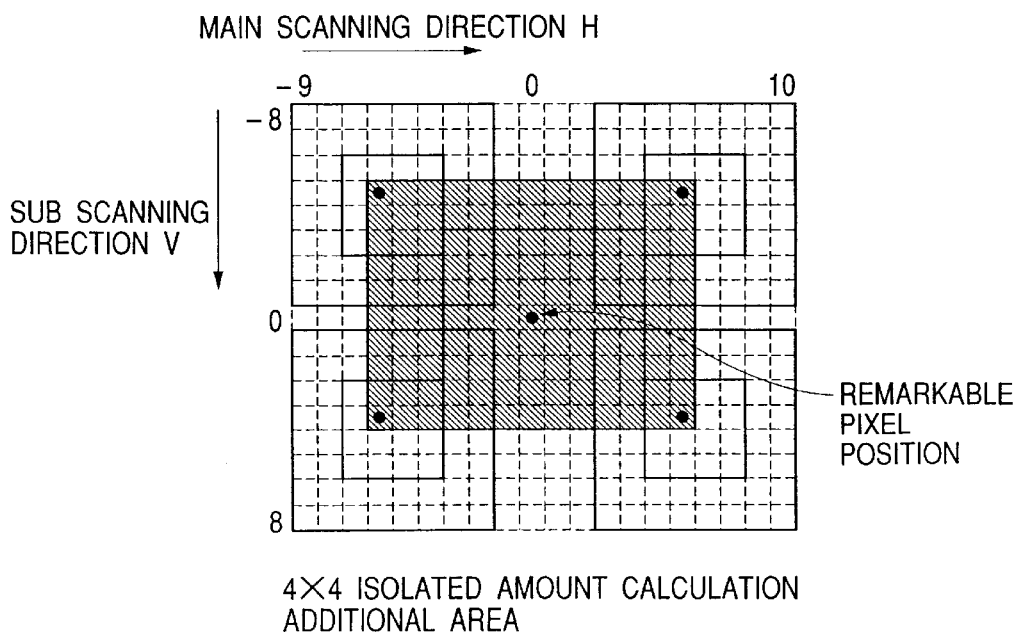
FIG. 36 is a diagram showing an isolated amount calculation additional area.

When FTRENB=1, the notch correction is performed. As shown in FIG. 30, in the notch correction, the discriminating signal KBDET generated in the character discrimination step (5) is observed in the 3×3 area. Thus, even if "1" does not stand in the central remarkable pixel, in a case where "1" continues in the four, i.e., longitudinal, lateral and two diagonal, directions passing through the center of the 3×3 area, it stands "1" in the remarkable pixel and then outputs the processing result MJIDET. Further, as shown in FIG. 31, if the eight pixels other than the central remarkable pixel are all "0", even if "1" stands in the remarkable pixel, it considers standing "1" to be "0" and then outputs the processing result MJIDET. In other cases, as the processing result MJIDET, the discriminating signal KBDET generated in the character discrimination step (5) is output as it is.

According to the above process, the portion in which the character signal could not be recognized due to a noise in the CCD, a spot on the original and the like can be corrected, and further the isolated signal which has been erroneously recognized to be the character can be eliminated.

When FTRENB=2, the thickening process is performed. In the thickening process, the discriminating signal KBDET generated in the character discrimination step (5) is observed in the 3×3 area. Thus, if "1" stands in at least one of the nine pixels, it stands "1" in the remarkable pixel and outputs the processing result MJIDET. In other cases, it sets the remarkable pixel to be "0" and then outputs the processing result MJIDET.

According to the above process, even if the outside of the edge could not be discriminated as the character portion in the density difference discrimination step (2-7), it is possible to discriminate even the color aberration portion as the character portion by expanding the character signal of one pixel. Thus, the color dot in the edge portion for causing deterioration in character reproduction can be suppressed.

(7) Output Fixation Selection

This step is to fix the level of the signal representing the character discrimination irrespective of the result MJIDET in the notch correction/thickening process step (6), and to determine an output result MDET according to the setting of a register MJIDSB. The output result MDET is controlled in a following manner.

If MJIDSB=0, then MDET=MJIDET (ordinary output).

If MJIDSB=1, then MDET=0 (character discriminating level "0": fixed to image portion).

If MJIDSB=2, then MDET=1 (character discriminating level "1": fixed to character portion).

Figure 37:
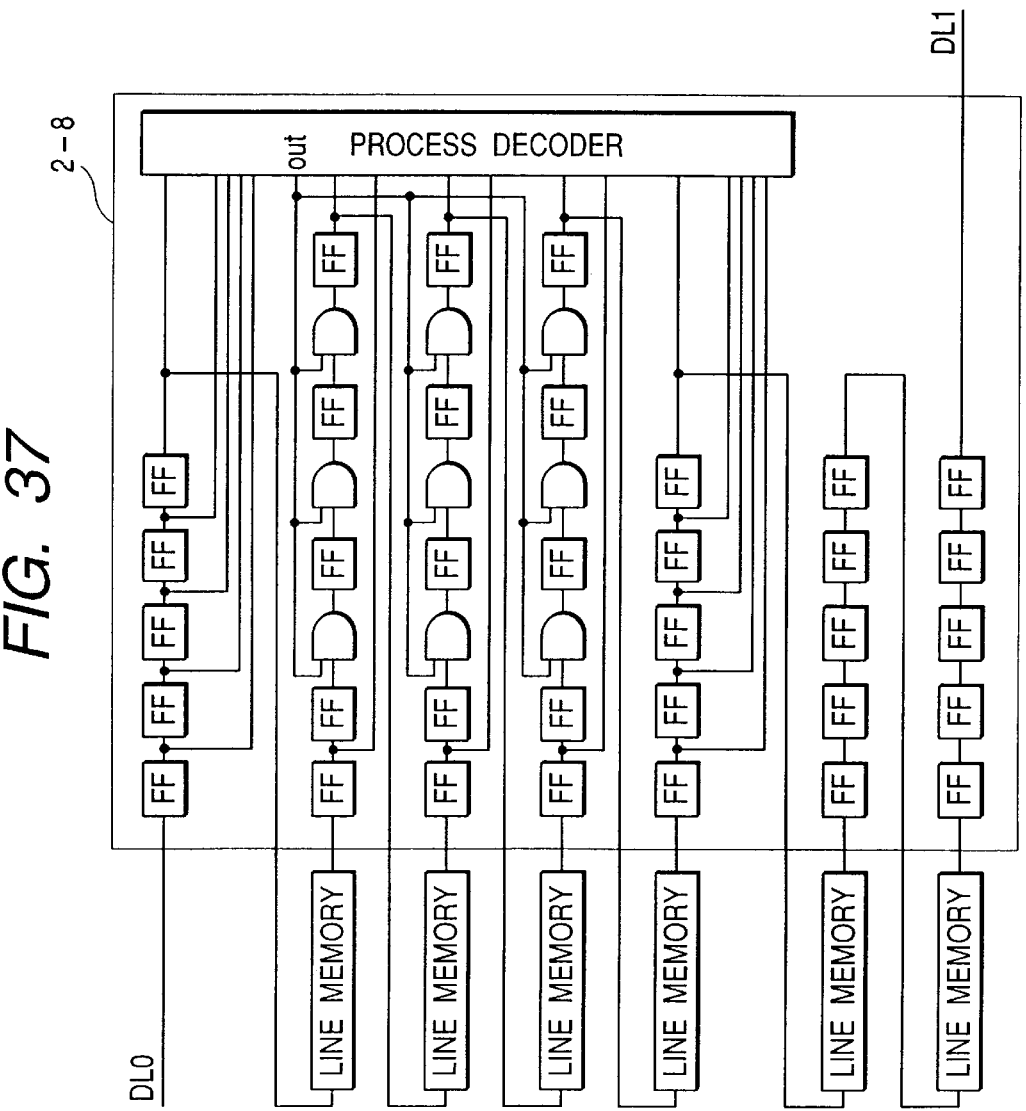
FIG. 37 is a block diagram showing a structure of a delta isolation discriminating unit (2-8)

Subsequently, FIG. 32 shows the block of hardware structure corresponding to the flow of the character discriminating process shown in FIG. 5. In the drawing, the block which performs the same process as that shown in FIG. 5 is added with the same reference numeral. Numeral 32-1 denotes a line memory for delaying the input signal by six lines such that the input signal of the two-dimensional area can be referred to by an average density calculation processing unit 2-2, an edge emphasis processing unit 2-3 and a corner missing countermeasure calculation processing unit 2-4. That is, the output signal from each line memory is connected to each corresponding block. Numeral 32-2 denotes a line memory for delaying the binarizing signal BDT output from a binarization processing unit 2-6. The line memory 32-2 is composed of line memories of 16 lines. An output signal from the line memory 32-2 is connected to an isolated amount calculation block of each of isolated amount calculation processing units 3-1, 3-2, 3-3 and 3-4. Each isolated amount calculation block is structured to be able to refer to the BDT data of maximally 17 lines in the sub scanning direction. FIGS. 33, 34, 35 and 36 respectively show the areas of BDT to be referred to when the isolated amounts are calculated for the respective areas. The calculated result of the isolated amount for each pixel in the gray area of each drawing is added, whereby the addition result of the isolated amount corresponding to the remarkable pixel position is calculated. Numerals 32-3 and 32-4 respectively denote line memories for adjusting, in the sub scanning direction, timing of output data PMJ[V][H] from a dot discrimination processing unit 4 and output data DL2[V][H] of a delta correction processing unit 2-9. The processes in a delta isolation discrimination processing unit 2-8 and the delta correction processing unit 2-9 for the above data DL0[V][H] are performed by using these line memories. The signals BDT[V][H] and DL0[V][H] are identical with each other at the timing in the sub scanning direction. However, PMHJ[V][H] being the result of the dot discrimination process performed by referring the two-dimensional area of the signal BDT is delayed by eight lines for the phase of the input signal BDT, whereby the line memories 32-3 and 32-4 are structured to be able to render delay of total eight lines. FIG. 37 shows an example of the circuit structure of the delta isolation discrimination processing unit 2-8. The example in FIG. 37 shows that the 5×5 area of the signal DL0 is referred to, and if the pixel of DL0=1 does not exist in the outermost peripheral pixels of the 5×5 area, the value of DL0 of the central 3×3 area is forcedly set to be "0". In a process decoder unit shown in FIG. 37, the data of the outer most peripheral 16 pixels of the 5×5 area being the referring pixel is input, and then each data value is discriminated. If the values of all the input pixels are "0", the signal of level "0" is output from an OUT terminal of the decoder unit. In other cases, the signal of level "1" is output. When the signal of level "0" is output from the OUT terminal, the data value of the area corresponding to the central 3×3 area within the 5×5 area is set to be "0" by AND gates connected to respective flip-flops. On the other hand, when the signal of level "1" is output from the OUT terminal, any data change is not performed. Further, the pixel of which data value has been rewritten in the above operation is input to a later-stage line memory to be delayed by a predetermined amount. By using the line memory to render such the predetermined delay amount as above, the data correction can be realized by referring to the two-dimensional area without adding a further line memory.

Figure 38:
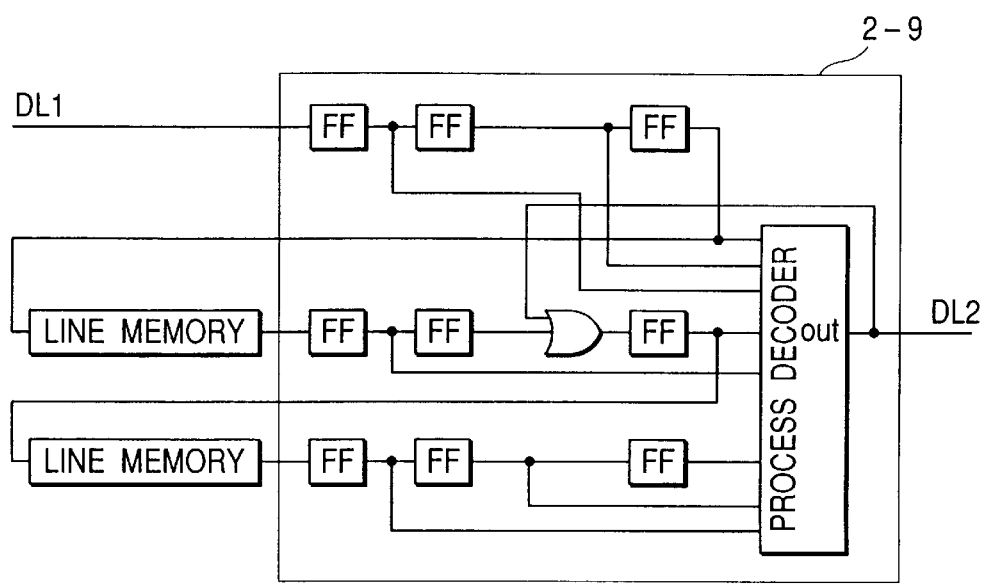
FIG. 38 is a block diagram showing a structure of a delta isolation discriminating unit (2-9)

FIG. 38 is a view showing the structure of the delta correction unit 2-9. Similar to the manner shown in FIG. 37, the delta correction process is performed by using the line memory for data delay. In FIG. 38, the pixel data of the eight pixels in the periphery of the 3×3 area are input to a process decoder unit. Then, if the input data values are coincident with the arrangement shown in FIG. 10, the signal of level "1" is output from an OUT terminal. On the other hand, if they are not coincident, the signal of level "0" is output. That is, the delta correction unit 2-9 is structured to perform the correction process in which the value of the central pixel of the 3×3 area is forcedly set to be "1" through an OR gate when the data are coincident with the patterns shown in FIG. 10.

Numeral 32-5 denotes a line memory in which a notch correction/thickening processing unit 6 refers to KBDET for the entire 3×3 area. The memories used therein, except for the memory 32-1, are all to delay the one-bit signal. Since it applies the circuit structure to perform, based on the one-bit data output by the binarization processing unit 2-6 and a density difference discrimination processing unit 2-7, subsequent processes to output the discriminating result for each pixel, it becomes possible to reduce the memory size and lower the cost.

Subsequently, structures of isolated amount addition processing units 3-5-1, 3-5-2, 3-5-3 and 3-5-4 and addition methods of the isolated amount will be described.

Each isolated amount addition processing unit performs a process to add the isolated amount calculated for each pixel to a predetermined area. The pixel area to be referred to when the isolated amount is added is shown in each of FIGS. 33, 34, 35 and 36. In the present embodiment, a case where the 5×5 area is referred to as the isolated amount addition area will be explained as an example.

As the addition methods, there are several kinds of methods as follows.

Figure 39:
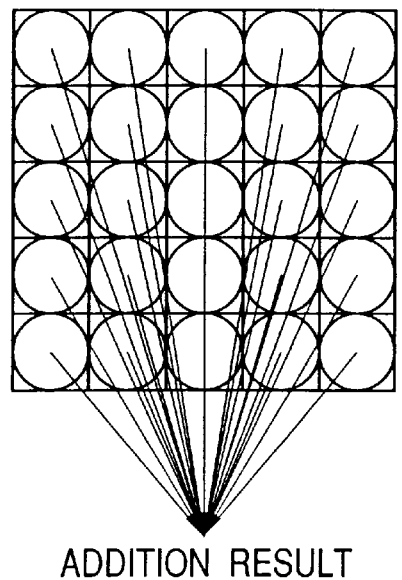
FIG. 39 is a block diagram showing an addition system of the isolated amount.

1. An Entire Parallel Method (FIG. 39)

The entire parallel method is the method to perform additions for the values of all of the 5×5 pixels. In this method, since the 25 additions are performed at once, 25 adders are necessary.

Figure 40:
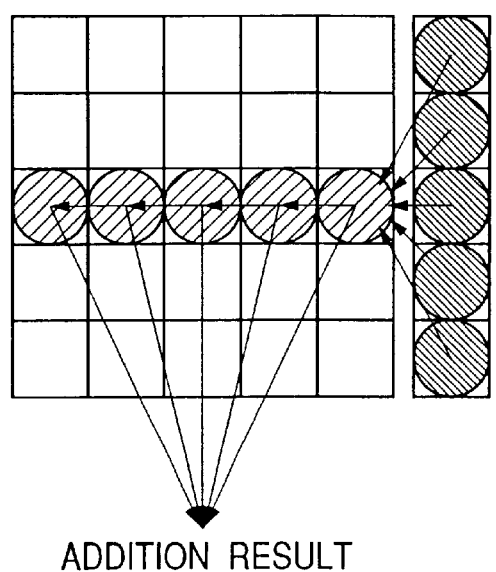
FIG. 40 is a block diagram showing an addition system of the isolated amount.

2. A Column Parallel Method (FIG. 40)

The column parallel method is the method to initially perform additions for five pixels in the longitudinal direction, and then, as shifting the addition result into the lateral direction, also perform further additions for five pixels in the lateral direction.

In this method, it may use only ten adders, i.e., five for the additions for five pixels in the longitudinal direction and five for the additions for five pixels in the lateral direction.

Figure 41:
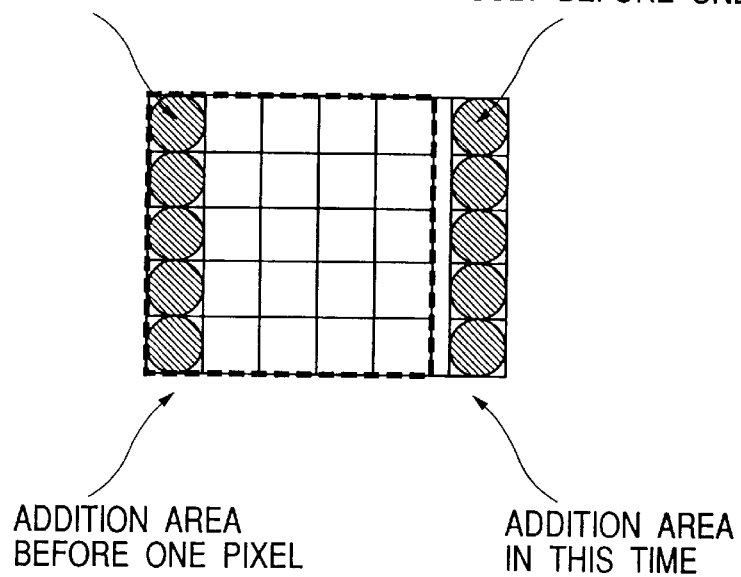
FIG. 41 is a block diagram showing an addition system of the isolated amount.

3. An Entire Sum Method (FIG. 41)

The entire sum method is the method using the addition result of 25 pixels obtained in the area of one previous pixel. In this method, to obtain the sum of the remarkable pixels, the addition result for five pixels in the longitudinal direction moved outside of the area when the area moves is subtracted from the total addition result of one previous pixel, and then the addition result for five pixels in the longitudinal direction newly moved inside of the area when the area moves is added.

In this method, it requires total 11 adders and one subtracter, i.e., two sets of five adders for the additions for five pixels in the longitudinal direction, one subtracter for subtracting the addition result for five pixels in the longitudinal direction from the entire sum, and one adder for adding the addition result for five pixels in the longitudinal direction from the entire sum.

Figure 42:
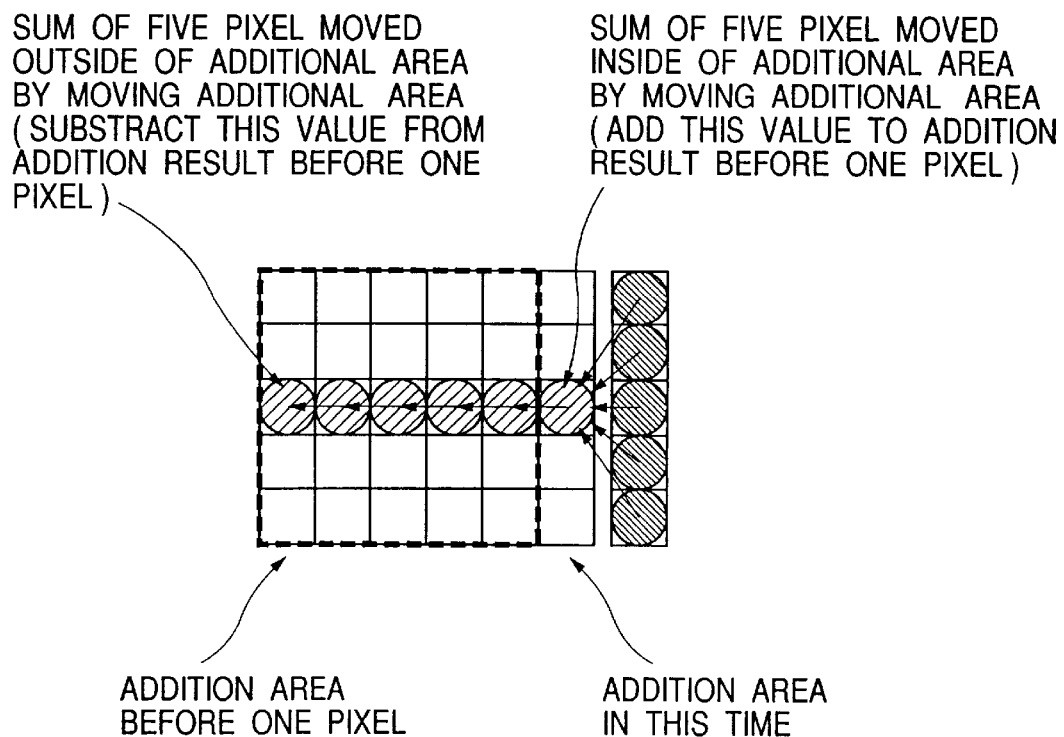
FIG. 42 is a block diagram showing an addition system of the isolated amount.

4. A Column Parallel Method+Entire Sum Method (FIG. 42)

This method is provided by combining both the concepts of the column parallel method and the entire sum method with each other. That is, like the entire sum method, the addition result for 25 pixels in the area of one previous pixel is used. In this method, to obtain the sum of the remarkable pixels, the addition result for five pixels in the longitudinal direction newly moved inside of the area when the area moves is added from the sum of one previous pixel. Then, by shifting such the added addition result for five pixels in the longitudinal direction, such the addition result itself is used as the value for five pixels in the longitudinal direction moved outside of the area when the area moves, to be subtracted from the sum of one previous pixel.

In this method, it requires total six adders and one subtracter, i.e., five adders for the additions for five pixels in the longitudinal direction, one adder for adding the addition result for five pixels in the longitudinal direction from the entire sum, and one subtracter for subtracting the addition result for shifted five pixels in the longitudinal direction from the entire sum.

They are the methods all obtaining the sum of the values for 25 pixels. However, in case of realizing these methods as hardware circuits, the circuit can be realized on a minimum scale when the "column parallel method+entire sum method" is applied.

(Other Embodiment)

In the above first embodiment, the isolated amount for the 4×4 area is calculated based on the 1×1 area of BDT. However, such the calculation may be changed according to the reading resolution of the input image. That is, in the first embodiment, the resolution of the input image is 600 dpi. However, if the reading resolution is low, the number of pixels of one dot is small. That is, when the input image is read at the resolution 300 dpi, the area corresponding to the 4×4 area in the case of resolution 600 dpi is the 2×2 area. Therefore, the structure to calculate the isolated amount for the area up to the 2×2 area may be applied to the low-resolution input image. On the contrary, even if the reading resolution is high, dot discriminating accuracy can be improved by applying the structure to calculate the isolated amount for the area equal to or larger than the 4×4 area.

Further, the area where the isolated amount for the 4×4 area is calculated based on the 1×1 area of BDT is determined based on the number of pixels constituting the dot in the dot image. Therefore, if the dot is discriminated by calculating the isolated amount for the 5×5 or 6×6 area wider than the 4×4 area, it becomes possible to discriminate the image area of which dot lines are more coarse as the dot area. Further, if the isolated amount addition area to which the calculated isolated amount is added is made wider than that in the first embodiment, the number of dots existing in the area increases. Thus, it becomes possible to discriminate the image area of which dot lines are more coarse as the dot area. However, in the character of which point number is small, it happens that the pattern similar to the dot appears. Thus, it is highly possible that the character area is erroneously discriminated as the dot area. Also, the circuit is made on an increased scale. Further, it raises a problem that a tendency to erroneously discriminate the pixel constituting the dot in the dot image as the dot pixel increases.

As explained above, according to the present embodiment, since the dot area is discriminated based on the result obtained by adding the isolation of the dot or screen dot to the predetermined area as the characteristic amount, the character/line image area and the dot area can be successfully separated from each other.

Further, since the isolations of the plural different-size are respectively detected, the dot images having the various numbers of lines can be separated from others.

Furthermore, since the isolation is calculated for each of the pixel (BDT=1) in which the dot exists and the pixel (BDT=0) in which no dot exists to discriminate the dot area, the dot image can be separated from others in various densities, from lower density to higher density.

As the value to be referred when the dot isolated amount is calculated, the signal obtained by binarizing the edge-emphasized remarkable pixel with use of the average value of the peripheral pixels is used. However, if the edge emphasis amount is set independently in the main and sub scanning directions, the binarizing signal for the signal obtained by correcting the MTF characteristics of the input image in the main and sub scanning directions can be used as the value to be referred. Thus, the dot (or screen dot) can be detected in a shape similar to a circle, thereby preventing the problem that the value of BDT as the result of binarizing tends to be easily linked in the lower MTF direction in the dot image of which density is close to the medium density. As a result, the isolation of the dot can be successfully detected.

Since it applies the structure to discriminate the character based on the dot discriminating result and the magnitude of the edge component of the remarkable pixel, it is possible to further apply the structure not to detect the edge component for the specific frequency component. Thus, it is possible to prevent that the fine-line image of the specific frequency is erroneously discriminated as the character area. For example, the gain of the input signal representing the halftone image area of 200 dpi longitudinal screen is reduced to zero by using the frequency component of 200 dpi, whereby it is possible to prevent that the value of DL0 being the discriminating result of the density difference discriminating unit (2-7) is discriminated as "1". Thus, it is possible to prevent that the 200 dpi longitudinal screen is erroneously discriminated as the character area. On the other hand, in a case where the image obtained by reading the halftone image of 200 dpi longitudinal screen at the resolution 600 dpi is input, the edge component of the 5×5 area in the edge emphasis process unit (2-5) is set to be "0" (EDKYD3=0) to use only the edge component of the 7×7 area. Thus, since it is possible to lower or reduce the gain in the edge emphasis for the frequency component of 200 dpi, it is also possible to prevent that the 200 dpi longitudinal screen in the continuous halftone area is erroneously discriminated as the character area.

As explained above, according to the embodiment of the present invention, the character portion or the image portion is discriminated based on the image data input from the scanner, and various image processes are switched according to the discriminated result. Thus, the process to cope with moire, color aberration or the like is performed, and further the process to prevent image deterioration is performed, thereby realizing the higher-quality color image.

As above, according to the embodiment of the present invention, the characteristic of the image can be effectively and accurately detected. Especially, the dot area and the line image area can be successfully distinguished from each other.

(Still Other Embodiment)

The present invention may be applied to a system structured by plural devices or to an apparatus structured by one device.

A processing method in which a program for operating the structure in the above embodiments to realize the functions in the above embodiments is stored in a storing medium and the embodiments are executed according to the program stored in the storing medium is included in the scope of the above embodiments of the present invention. Besides, the storing medium in which the above program has been stored is also included in the scope of the above embodiments of the present invention.

As such the storing medium, e.g., a floppy disk, a hard disk, an optical disk, a magneto-optical disk, a CD-ROM, a magnetic tape, a non-volatile memory card, a ROM or the like can be used.

Further, not only a case where the process is executed by the program itself stored in the above storing medium, but also a case where the operation in the above embodiments is executed by the program operating on an operation system (OS) in cooperation with other softwares and functions of an expansion board is included in the scope of the above embodiments of the present invention.

What is claimed is:

1. An image processing apparatus which extracts a line image portion, comprising:

calculating means for calculating an isolated amount of a pixel value in each of plural areas respectively having different sizes, the isolated amount representing isolation of a pixel with respect to plural directions in the plural areas;

means for adding isolated amounts calculated for at least one of the plural areas to obtain one or more sums;

comparing means for comparing one or more sums of isolated amounts with one or more respective predetermined values;

discriminating means for discriminating a dot image portion according to an output value of said comparing means; and extracting means for extracting the line image portion from an image including plural image portions respectively having different attributes, according to a result obtained by said discriminating means.

2. An apparatus according to claim 1, wherein the pixel value is represented by binary data.

3. An apparatus according to claim 2, wherein the binary data is obtained by binarizing a value of a pixel of interest that is edge-emphasized to correct frequency characteristics in horizontal and vertical directions, with use of an average pixel value in a periphery of the pixel of interest as a threshold.

4. An apparatus according to claim 1, further comprising determining means for determining a magnitude of an edge component, and wherein said calculating means performs the calculation in accordance with a determining result by said determining means.

5. An apparatus according to claim 4, wherein said discriminating means has judging means for judging continuity of an edge.

6. An apparatus according to claim 1, wherein said calculating means refers to a plurality of different predetermined areas and peripheral areas of the predetermined areas and calculates the isolated amount based on the number of pixels having a predetermined value in each of the areas.

7. An image processing method in which a line image portion is extracted, comprising the steps of:

calculating an isolated amount of a pixel value in each of plural areas respectively having different sizes, the isolated amount representing isolation of a pixel with respect to plural directions in the plural areas;

adding isolated amounts calculated for at least one of the plural areas to obtain one or more sums;

comparing one or more sums of isolated amounts with one or more respective predetermined values;

discriminating a dot image portion according to an output value of said comparing step; and extracting the line image portion from an image including plural image portions respectively having different attributes, according to a result obtained in said discriminating step.

8. A computer-readable medium containing program codes for extracting a line image portion, said medium containing program codes for performing the steps of:

calculating an isolated amount of a pixel value in each of plural areas respectively having different sizes, the isolated amount representing isolation of a pixel with respect to plural directions in the plural areas;

adding isolated amounts calculated for at least one of the plural areas to obtain one or more sums;

comparing one or more sums of isolated amounts with one or more respective predetermined values;

discriminating a dot image portion according to an output value of said comparing step; and extracting the line image portion from an image including plural image portions respectively having different attributes, according to a result obtained in said discriminating step.

* * * * *

UNITED STATES PATENT AND TRADEMARK OFFICE
CERTIFICATE OF CORRECTION

PATENT NO. : 6,714,676 B2
DATED : March 30, 2004
INVENTOR(S) : Yamagata et al.

It is certified that error appears in the above-identified patent and that said Letters Patent is hereby corrected as shown below:

<u>Drawings</u>,
Figure 5, "BINALIZING" should read -- BINARIZING --.
Figure 10, "DONT CARE" should read -- DON'T CARE --;
Figure 11A, "PATTERN," should read -- PATTERNS, --.
Figure 11B, "PATTERN," shoud read -- PATTERNS --;
Figure 17, "DONT CARE" should read -- DON'T CARE --; and "PATTERN," should read -- PATTERNS, --;
Figure 18, "DONT CARE" should read -- DON'T CARE --; and "PATTERN," should read -- PATTERNS, --;
Figure 24, "dnnn DIRECTION" should read -- dKnnn DIRECTION --.
Figure 30, "SHOW IN THESE FIGURE" should read -- SHOWN IN THESE FIGURES --; and
Figure 31, "SHOW" should read -- SHOWN --.

<u>Column 7</u>,
Line 37, "suppress" should read -- suppresses --.

<u>Column 9</u>,
Line 18, "KOM[x][y]," should read -- KM0[x][y] --; and
Line 25, "KMO[x][y]}" should read -- KM0[x][y]} --.

<u>Column 10</u>,
Lines 51 and 59, "obtained." should read -- obtained --.

<u>Column 14</u>,
Lines 51, 53 and 54, "Kaa1[V][H]" should read -- KAA1[V][H] --; and
Line 56, "Kaa0[V][H]" should read -- KAA0[V][H] --.

<u>Column 15</u>,
Lines 14, 16 and 17, "Kaa0[V][H]" should read -- KAA0[V][H] --.

<u>Column 17</u>,
Line 20, "2][H-1" should read -- 2][H+1 --; and
Line 22, "[H-+]" should read -- [H-1] --.

<u>Column 21</u>,
Line 40, "BDT[V][H+1]0" should read -- BDT[V][H+1]=0 --.

UNITED STATES PATENT AND TRADEMARK OFFICE
CERTIFICATE OF CORRECTION

PATENT NO. : 6,714,676 B2
DATED : March 30, 2004
INVENTOR(S) : Yamagata et al.

It is certified that error appears in the above-identified patent and that said Letters Patent is hereby corrected as shown below:

Column 22,
Line 30, "Kaa1[V][H], Kaa0[V][H]," should read -- KAA1[V][H], KAA0[V][H], --.

Column 23,

Line 5, " $\sum_{y=-5}^{5}$ " should read -- $\sum_{y=-6}^{6}$ --; and

Line 50, "MPJ[V][H]=1" should read -- PMJ[V][H]=1 --.

Signed and Sealed this

Twenty-second Day of February, 2005

JON W. DUDAS
*Director of the United States Patent and Trademark Office*